(12) United States Patent
Taguchi

(10) Patent No.: US 10,541,858 B2
(45) Date of Patent: Jan. 21, 2020

(54) THIN CLIENT SYSTEM, MANAGEMENT SERVER, WORKPLACE ENVIRONMENT SETTING METHOD AND WORKPLACE ENVIRONMENT SETTING PROGRAM

(71) Applicant: NEC Corporation, Minato-ku, Tokyo (JP)

(72) Inventor: Masahiko Taguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1457 days.

(21) Appl. No.: 13/754,338

(22) Filed: Jan. 30, 2013

(65) Prior Publication Data

US 2013/0238775 A1 Sep. 12, 2013

(30) Foreign Application Priority Data

Mar. 6, 2012 (JP) .................................. 2012-048851

(51) Int. Cl.
*H04L 12/24* (2006.01)
(52) U.S. Cl.
CPC .................................... *H04L 41/00* (2013.01)
(58) Field of Classification Search
CPC ..... H04L 12/24; H04L 41/00; H04L 41/0213; H04L 29/08072; H04L 29/06;
(Continued)

(56) References Cited

U.S. PATENT DOCUMENTS 7,478,394 B1 * 1/2009 de Dinechin ........... G06F 9/462
712/228

2002/0013802 A1 * 1/2002 Mori ..................... G06F 9/5016
718/1

(Continued)

FOREIGN PATENT DOCUMENTS

CN 102057355 A 5/2011
JP 2007-272297 A 10/2007
(Continued)

OTHER PUBLICATIONS

Memory buddies: exploiting page sharing for smart colocation in virtualized data centers, Author:Timothy wood et al., Operating Systems Review, ACM, New York, NY, US, vol. 43, No. 3, Jul. 1, 2009 (Jul. 1, 2009), pp. 27-36.*

(Continued)

*Primary Examiner* — Wing F Chan
*Assistant Examiner* — Mehulkumar J Shah

(57) ABSTRACT

A thin client system comprises a plurality of virtual desktop environment servers each including a virtual desktop environment in which a workplace environment is generated in a virtual machine, and a management server which manages setting of the virtual desktop environment and the virtual desktop environment server, wherein the management server comprises an OS sorting unit which generates information of an OS sorting result obtained by sorting the virtual desktop environment servers in the order of failing to have a virtual machine whose OS is other than OS of a virtual machine to be newly created, and a VM creating unit which determines the virtual desktop environment server in which the virtual machine is to be created based on the OS sorting result information by giving preference to the virtual desktop environment server failing to have a virtual machine having that other OS.

10 Claims, 15 Drawing Sheets

(58) Field of Classification Search
CPC ....... H04L 41/22; H04L 41/12; G06F 9/4445; G06F 2009/45562; G06F 9/45558; G06F 9/452; G06F 9/455; G06F 9/451
USPC .......................................... 709/223; 370/254
See application file for complete search history.

(56) References Cited

U.S. PATENT DOCUMENTS

| | | | |
|---|---|---|---|
| 2005/0198303 A1* | 9/2005 | Knauerhase | G06F 9/5055 709/227 |
| 2005/0289540 A1* | 12/2005 | Nguyen | G06F 9/45558 718/1 |
| 2007/0174410 A1* | 7/2007 | Croft | G06F 3/1415 709/208 |
| 2008/0089338 A1* | 4/2008 | Campbell | H04L 12/24 370/392 |
| 2009/0165134 A1* | 6/2009 | Flake | G06F 17/30899 726/22 |
| 2009/0265707 A1* | 10/2009 | Goodman | G06F 9/5016 718/1 |
| 2009/0313620 A1 | 12/2009 | Sedukhin et al. | |
| 2010/0306770 A1* | 12/2010 | Frank | G06F 9/45558 718/1 |
| 2011/0010420 A1* | 1/2011 | Kagitani | H04L 67/34 709/203 |
| 2011/0022812 A1* | 1/2011 | van der Linden | G06F 9/5077 711/163 |
| 2011/0161957 A1* | 6/2011 | Bernardi | G06F 9/4445 718/1 |
| 2011/0173605 A1* | 7/2011 | Bourne | G06F 8/71 717/176 |
| 2011/0214122 A1 | 9/2011 | Lublin et al. | |
| 2011/0225277 A1* | 9/2011 | Freimuth | G06F 9/45558 709/223 |
| 2011/0251992 A1* | 10/2011 | Bethlehem | H04L 12/2863 707/610 |
| 2012/0017215 A1 | 1/2012 | Koshiba | |
| 2012/0144391 A1* | 6/2012 | Ueda | G06F 9/45558 718/1 |
| 2013/0054426 A1* | 2/2013 | Rowland | G06F 9/5011 705/27.2 |
| 2013/0179648 A1* | 7/2013 | Yagame | G06F 3/0604 711/156 |

FOREIGN PATENT DOCUMENTS

| | | |
|---|---|---|
| JP | 2010-211259 A | 9/2010 |
| JP | 2010205047 A | 9/2010 |

OTHER PUBLICATIONS

VMPlants:Providing and managing Virtual Machine execution environments for Grid computing, Author:Ivan Krsul, IEEE 2004, Nov. 6, 2004, pp. 1-12.*
Timothy Wood et al., "Memory Buddies: Exploiting Page Sharing for Smart Colocation in Virtualized Data Centers", Operating Systems Review, ACM, XP-002659038, vol. 43, No. 3, Jul. 1, 2009, pp. 27-36.
Ivan Krsul et al.,"VMPlants: Providing and Managing Virtual Machine Execution Environments for Grid Computing", Supercomputing, IEEE 2004, Nov. 6, 2004, XP10780332A, ISBNO-7695-2153-3, pp. 1-12.
The Extended European Search Report for EP Application No. 13 15 2657.6 dated Jul. 1, 2013.
Japanese Office Action for JP Application No. 2012-048851 dated Sep. 29, 2015 with English Translation.
Chinese Office Action for CN Application No. 201310053305.4 dated Apr. 6, 2017 with English Translation.

* cited by examiner

FIG. 5

200 WORKPLACE DB

| Group | OS | NW DEFAULT | DATA DEFAULT | NW SPARE | DATA SPARE | AP IN USE | PERIPHERAL APPARATUS |
|---|---|---|---|---|---|---|---|
| 1 | 1 | Gold | Gold | Basic | Basic | AP1 | USB |
| 2 | 1 | Gold | Basic | Basic | — | AP2 | PRINTER |
| 3 | 2 | Basic | Gold | — | Basic | AP1 | PRINTER |

201 MENU DB

| Type | MENU NAME | MENU CONTENTS | PERFORMANCE VALUE |
|---|---|---|---|
| NW | Gold | 1Gbps BAND ENSURED | 1.0G |
| NW | Basic | BEST EFFORT | 100M |
| Date | Gold | SAN100GB(FC4Gbps) WITH BACKUP | 100G |
| Date | Basic | FILE SERVER (100Mbps) | 0G |

202 VDSDB

| VDS | OS | Group | NIC1 | NIC2 | TOTAL BAND | ENTIRE SAN | FREE BAND | REMAINING SAN |
|---|---|---|---|---|---|---|---|---|
| 1 | 1,2 | 2,3 | 1G | 100M | 7.5G | 950G | 3.7G | 150G |
| 2 | 1,2 | 3 | 1G | 100M | 7.5G | 550G | 7.0G | 50G |
| 3 | 1,2 | 1,2,3 | 1G | 100M | 7.5G | 550G | 3.4G | 350G |
| 4 | 1,2 | 1,3 | 1G | 100M | 7.5G | 550G | 6.4G | 350G |
| 5 | 1,2 | 2 | 1G | 100M | 5.5G | 750G | 0.5G | 750G |
| 6 | 1,2 | — | 1G | 100M | 7.5G | 250G | 7.5G | 250G |
| 7 | 1,2 | 1 | 1G | 100M | 7.5G | 250G | 3.5G | 150G |
| 8 | 1,2 | 2 | 1G | 100M | 7.5G | 250G | 6.5G | 150G |
| 9 | 1 | — | 1G | 100M | 7.5G | 250G | 4.5G | 250G |
| 10 | 1 | 1,2 | 1G | 100M | 7.5G | 250G | 2.5G | 250G |
| 11 | 1 | — | 1G | 100M | 7.5G | 250G | 0.5G | 50G |
| 12 | 1,2 | 1,2 | 1G | 100M | 7.5G | 250G | 2.5G | 50G |
| 13 | 2 | 3 | 1G | 100M | 7.5G | 950G | 6.7G | 150G |
| 14 | 1,2 | 2 | 1G | 100M | 7.5G | NONE | 6.5G | NONE |
| 15 | 1,2 | 3 | 100M | — | 0.5G | 750G | 0.3G | 550G |

203 CONNECTION DB

| Group | VDS | DEFAULT | VD |
|---|---|---|---|
| 1 | 3 | | A |
| 1 | 4 | YES | B |
| 1 | 7 | YES | C |
| 1 | 8 | YES | D |
| 1 | 11 | YES | EF |
| 1 | 12 | YES | GHIJKLM |
| 2 | 1 | YES | ABC |
| 2 | 3 | YES | DEF |
| 2 | 5 | YES | GHIJK |
| 2 | 7 | YES | LMN |
| 2 | 9 | YES | OPQ |
| 2 | 11 | YES | PST |
| 2 | 14 | YES | U |
| 3 | 1 | | ABCDEFGH |
| 3 | 2 | YES | IJKLM |
| 3 | 3 | YES | N |
| 3 | 4 | YES | O |
| 3 | 13 | YES | PQRSTUVW |
| 3 | 15 | YES | XY |

204 ORGANIZATION DB

| Group | User |
|---|---|
| 1 | 1A |
| 2 | 2A |
| 3 | 3A |
| 1 | 1B |
| 2 | 2B |

FIG. 16

204 ORGANIZATION DB

| Group | User |
|-------|------|
| 1 | 1A |
| 2 | 2A |
| 3 | 3A |
| 1 | 1B |
| 2 | 2B |

210 WORKPLACE DB (CONVENTIONAL ART)

| Group | OS | AP FOR USE | PERIPHERAL APPARATUS |
|-------|----|-----------|-----------|
| 1 | 1 | AP1 | USB |
| 2 | 1 | AP2 | PRINTER |
| 3 | 2 | AP1 | PRINTER |

THIN CLIENT SYSTEM, MANAGEMENT SERVER, WORKPLACE ENVIRONMENT SETTING METHOD AND WORKPLACE ENVIRONMENT SETTING PROGRAM

TECHNICAL FIELD

The present invention relates to a workplace environment setting system and, more particularly, a workplace environment setting system in a thin client system.

BACKGROUND ART

In these years, from the viewpoints of security and operation cost reduction, a thin client system in which desktop environments are aggregated on a server has attracted attention. Thin client system enhances security by transferring a screen of a virtual machine (VM) in remote connection from a thin client terminal to a virtual machine to eliminate the thin client terminal' need of having data or a business application. Thin client system also enables aggregation of desktop environments to be enhanced by operating a plurality of virtual machines by one hypervisor by server virtualization techniques.

Thin client system in common has a problem that an increased number of virtual machines to be managed will increase labors for management of virtual desktop environments. It is therefore necessary to manage virtual desktop environments with ease.

Disclosed as Background Art is, for example, a virtual desktop workplace environment management method of Patent Literature 1. This management method enables reduction in the number of workplace processes required for establishing/setting a thin client system.

Aiming at reducing the number of workplace processes required for establishing/setting a system, the management method recited in Patent Literature 1 has the following three characteristics.

First characteristic is that workplace environments are managed on an arbitrary group basis such as a personnel organization or a project in this management method.

Second characteristic is that workplace environments include two kinds of data, one related to virtual desktop environment setting having OS of a virtual machine as a template and the other related to workplace setting indicative of a working server or a business application (AP) for executing working and a peripheral apparatus to be connected to a thin client terminal.

Third characteristic is that this management method enables a workplace environment to be automatically set to a virtual machine according to a user group when a thin client terminal connects to a virtual desktop environment.

Background art will be described with reference to FIG. 15 and FIG. 16. FIG. 15 shows a VDS (Virtual Desktop Server) environment including a template 350 of OS of a virtual machine 310 which can be handled by a hypervisor 300, the virtual machine 310 created based on the template, a terminal connection network 330 for the connection to a thin client terminal through a physical NIC of the hypervisor 300, a data connection network 340 for the connection to a storage 320 of the hypervisor 300, and the storage 320.

FIG. 16 shows a structural diagram of a table of a data base according to the background art, which has a workplace DB 210 and an organization DB 204.

First characteristic is that the organization DB 204 in FIG. 16 represents a group of users, and a Group column in the workplace DB 210 has groups. This arrangement enables reference to a workplace environment according to a group of a user.

Second characteristic is that an OS column of the workplace DB 210 has virtual desktop environment setting, and columns of AP in use and peripheral apparatus have workplace setting. This arrangement enables a workplace environment to be provided for each group.

Third characteristic is that when a user requests connection to a virtual desktop environment, a group of the user is obtained from the organization DB 204 and a workplace environment of the group is obtained from the workplace DB 210 to instruct the hypervisor and the virtual machine to generate a workplace environment. This method enables automatic workplace environment setting.

When a user "User 1A" requests connection to a virtual desktop environment, for example, obtain a group "1" from the organization DB 204 and obtain virtual desktop environment setting of "1" as OS, and workplace setting of "AP1" as an AP for use and "USB" as a peripheral apparatus from the workplace DB 210 to instruct the hypervisor 300 and the virtual machine 310 to generate a workplace environment.

Then, when the User 1A works in the virtual desktop environment, the business application AP1 is installed on the virtual machine 310 of the OS1 to enable use of the USB.

Thus, using these characteristics, the background art attains an object of reducing the number of working processes required for establishing/setting a system.

As related art, optimally locating a virtual machine based on characteristics of server virtualization in general optimizes hypervisor resource consumption to have the following four effects.

First is "increased memory efficiency realized by unification of a virtual machine OS". This represents that since a hypervisor is characterized in being capable of efficiently handling a real memory when a virtual machine has the same OS, unifying OSs of virtual machines attains an effect of increasing a memory utilization ratio.

Second is "simplification of wiring realized by unification of virtual networks". This represents that since a hypervisor is characterized in enabling communication of a plurality of virtual networks (e.g. a network having segments divided by such a method as the tag VLAN (Virtual LAN) or the like) by one physical NIC (Network Interface Card), unifying networks to which a virtual machine on a hypervisor accesses results in having a virtual network to one-to-one correspond to a LAN cable to which the hypervisor connects, thereby preventing wires from being complicated.

Third is "band limitation by changing setting of a virtual machine NIC rate". This represents that since a hypervisor is characterized in capable of changing an NIC rate of a virtual machine, changing NIC rates of a plurality of virtual machines on the hypervisor attains an effect of realizing band limitation of traffic of a physical NIC of the hypervisor.

Fourth is "data preserving region realized by other virtual disk than a virtual machine OS region". This represents that since a hypervisor is characterized in being capable of enabling a virtual machine to recognize a virtual disk formed on a storage connected to SAN (Storage Area Network) or a local disk on a hypervisor, making the virtual machine recognize a virtual disk other than a virtual machine OS region attains an effect of having a data storage region.

Patent Literature 1: Japanese Patent Laying-Open No. 2010-205047.

Since the background art disclosed in Patent Literature 1 fails to handle the characteristics of virtualization of a server in a workplace environment, it is impossible to realize optimum locating of a virtual machine based on the characteristics of server virtualization, so that optimization of resource consumption of a hypervisor is impossible. More specifically, there are five problems, of which four are related to characteristics of server virtualization and one is related to side effects of the invention.

First, as to "increased memory efficiency realized by unification of a virtual machine OS", since the background art itself has no mechanism that makes a virtual machine of a different OS be unlikely to coexist, virtual machines of different OSs will readily exist on the same hypervisor, so that the effect of increasing memory efficiency cannot be attained. Creating a virtual machine or relocation of virtual machines in the lump following a change of a workplace environment, for example, according to the background art will not attain the effect of increasing memory efficiency.

Secondly, as to "simplification of wiring realized by unification of virtual networks", the background art fails to have a mechanism which makes a network to be connected to a different working server be unlikely to coexist. As a result, a plurality of virtual networks will readily exist on the same hypervisor, resulting in failing to obtain the effect of wiring simplification. Creating a virtual machine or relocation of virtual machines in the lump following a change of a workplace environment, for example, according to the background art will not attain the effect of simplification of wiring.

Thirdly, as to "band limitation by changing setting of a virtual machine NIC rate", since the background art in itself fails to have a value of a NIC rate for the determination of band limitation, band limitation effects cannot be attained. Relocation of virtual machines in the lump following a change of a workplace environment, for example, according to the background art will result in failing to cope with a network band shortage in relocation for maintaining data connection following a workplace change.

Fourthly, as to "data preserving region realized by other virtual disk than a virtual machine OS region", since the background art in itself fails to have a value indicative of a use situation of a data storage region, at the time of capacity shortage, temporary replacement by a file server is impossible. Relocation of virtual machines in the lump following a change of a workplace environment, for example, according to the background art will result in failing to cope with a data storage region shortage caused by relocation for maintaining a NW (Network) band following a workplace change.

Fifthly, as to "side effects of the invention", only by setting minute set values to a workplace environment related to the third "band limitation by changing setting of a virtual machine NIC rate" and the fourth "data preserving region realized by other virtual disk than a virtual machine OS region", more loads will be imposed on one who sets the workplace environment than those in the background art.

OBJECT OF THE INVENTION

An object of the present invention is to solve the above-described problems and provide a thin client system which optimally locates virtual machines based on characteristics of server virtualization, a management server, a workplace environment setting method, and a workplace environment setting program thereof.

SUMMARY

A first thin client system according to an exemplary aspect of the invention comprises a plurality of virtual desktop environment servers each including a virtual desktop environment in which a workplace environment is generated in a virtual machine, and a management server which manages setting of the virtual desktop environment and the virtual desktop environment server, wherein the management server comprises an OS sorting unit which generates information of an OS sorting result obtained by sorting the virtual desktop environment servers in the order of failing to have a virtual machine whose OS is other than OS of a virtual machine to be newly created, and a VM creating unit which determines the virtual desktop environment server in which the virtual machine is to be created based on the OS sorting result information by giving preference to the virtual desktop environment server failing to have a virtual machine having that other OS.

A second thin client system according to an exemplary aspect of the invention comprises a plurality of virtual desktop environment servers each including a virtual desktop environment in which a workplace environment is generated in a virtual machine, and a management server which manages setting of the virtual desktop environment and the virtual desktop environment server, wherein the management server comprises an OS sorting unit which when data connection of the virtual desktop environment is changed, generates information of an OS sorting result obtained by sorting the virtual desktop environment servers in the order of failing to have a virtual machine whose OS is other than OS of a virtual machine related to the change of the data connection and failing to have a template of OS other than OS of the virtual machine related to the change of the data connection, a data ensuring unit which generates information of sorting of the virtual desktop environment servers in the order of failing to have a virtual machine having the other OS and failing to have a template of the other OS based on the information generated by the OS sorting unit, and a relocation destination selection unit which preferentially selects the virtual desktop environment server in which the virtual desktop environment is to relocate in the order of failing to have a virtual machine having the other OS and failing to have a template of the other OS based on the information generated by the data ensuring unit.

A third thin client system according to an exemplary aspect of the invention comprises a plurality of virtual desktop environment servers each including a virtual desktop environment in which a workplace environment is generated in a virtual machine, and a management server which manages setting of the virtual desktop environment and the virtual desktop environment server, wherein the management server comprises a Group sorting unit which when terminal connection of the virtual desktop environment is changed, generates information of a Group sorting result obtained by sorting the virtual desktop environment servers in the order of having the same workplace environment as a workplace environment of a virtual machine related to the change of the terminal connection and having a smaller number of other workplace environments than the workplace environment of the virtual machine related to the change of the terminal connection, an NW ensuring unit which generates information of sorting of the virtual desktop environment servers in the order of having the same workplace environment and having a smaller number of other workplace environments based on the information generated by the Group sorting unit, and a relocation destination selection unit which preferentially selects the virtual desktop environment server in which the virtual desktop environment is to relocate in the order of having the same workplace environment and having a smaller number of other workplace environments based on the information generated by the NW ensuring unit.

A first management server according to an exemplary aspect of the invention which manages setting of a plurality of virtual desktop environment servers each including a virtual desktop environment in which a workplace environment is generated in a virtual machine and setting of the virtual desktop environment, comprises an OS sorting unit which generates information of an OS sorting result obtained by sorting the virtual desktop environment servers in the order of failing to have a virtual machine whose OS is other than OS of a virtual machine to be newly created, and a VM creating unit which determines the virtual desktop environment server in which the virtual machine is to be created based on the OS sorting result information by giving preference to the virtual desktop environment server failing to have a virtual machine having that other OS.

A second management server according to an exemplary aspect of the invention which manages setting of a plurality of virtual desktop environment servers each including a virtual desktop environment in which a workplace environment is generated in a virtual machine and setting of the virtual desktop environment, comprises an OS sorting unit which when data connection of the virtual desktop environment is changed, generates information of an OS sorting result obtained by sorting the virtual desktop environment servers in the order of failing to have a virtual machine whose OS is other than OS of a virtual machine related to the change of the data connection and failing to have a template of OS other than OS of the virtual machine related to the change of the data connection, a data ensuring unit which generates information of sorting of the virtual desktop environment servers in the order of failing to have a virtual machine having the other OS and failing to have a template of the other OS based on the information generated by the OS sorting unit, and a relocation destination selection unit which preferentially selects the virtual desktop environment server in which the virtual desktop environment is to relocate in the order of failing to have a virtual machine having the other OS and failing to have a template of the other OS based on the information generated by the data ensuring unit.

A third management server according to an exemplary aspect of the invention which manages setting of a plurality of virtual desktop environment servers each including a virtual desktop environment in which a workplace environment is generated in a virtual machine and setting of the virtual desktop environment, comprises a Group sorting unit which when terminal connection of the virtual desktop environment is changed, generates information of a Group sorting result obtained by sorting the virtual desktop environment servers in the order of having the same workplace environment as a workplace environment of a virtual machine related to the change of the terminal connection and having a smaller number of other workplace environments than the workplace environment of the virtual machine related to the change of the terminal connection, an NW ensuring unit which generates information of sorting of the virtual desktop environment servers in the order of having the same workplace environment and having a smaller number of other workplace environments based on the information generated by the Group sorting unit, and a relocation destination selection unit which preferentially selects the virtual desktop environment server in which the virtual desktop environment is to relocate in the order of having the same workplace environment and having a smaller number of other workplace environments based on the information generated by the NW ensuring unit.

A first workplace environment setting method according to an exemplary aspect of the invention by a management server which manages setting of a plurality of virtual desktop environment servers each including a virtual desktop environment in which a workplace environment is generated in a virtual machine and setting of the virtual desktop environment, comprises an OS sorting step executed by an OS sorting unit of generating information of an OS sorting result obtained by sorting the virtual desktop environment servers in the order of failing to have a virtual machine whose OS is other than OS of a virtual machine to be newly created, and a VM creating step executed by a VM creating unit of determining the virtual desktop environment server in which the virtual machine is to be created based on the OS sorting result information by giving preference to the virtual desktop environment server failing to have a virtual machine having that other OS.

A second workplace environment setting method according to an exemplary aspect of the invention by a management server which manages setting of a plurality of virtual desktop environment servers each including a virtual desktop environment in which a workplace environment is generated in a virtual machine and setting of the virtual desktop environment, comprises an OS sorting step executed by an OS sorting unit of, when data connection of the virtual desktop environment is changed, generating information of an OS sorting result obtained by sorting the virtual desktop environment servers in the order of failing to have a virtual machine whose OS is other than OS of a virtual machine related to the change of the data connection and failing to have a template of OS other than OS of the virtual machine related to the change of the data connection, a data ensuring step executed by a data ensuring unit of generating information of sorting of the virtual desktop environment servers in the order of failing to have a virtual machine having the other OS and failing to have a template of the other OS based on the information generated by the OS sorting unit, and a relocation destination selecting step executed by a relocation destination selection unit of preferentially selecting the virtual desktop environment server in which the virtual desktop environment is to relocate in the order of failing to have a virtual machine having the other OS and failing to have a template of the other OS based on the information generated by the data ensuring unit.

A third workplace environment setting method according to an exemplary aspect of the invention by a management server which manages setting of a plurality of virtual desktop environment servers each including a virtual desktop environment in which a workplace environment is generated in a virtual machine and setting of the virtual desktop environment, comprises a Group sorting step executed by a Group sorting unit of, when terminal connection of the virtual desktop environment is changed, generating information of a Group sorting result obtained by sorting the virtual desktop environment servers in the order of having the same workplace environment as a workplace environment of a virtual machine related to the change of the terminal connection and having a smaller number of other workplace environments than the workplace environment of the virtual machine related to the change of the terminal connection, a NW ensuring step executed by an NW ensuring unit of generating information of sorting of the virtual desktop environment servers in the order of having the same workplace environment and having a smaller number of other workplace environments based on the information generated by the Group sorting unit, and a relocation destination selecting step executed by a relocation destination selection unit of preferentially selecting the virtual desktop environment server in which the virtual desktop environment is to relocate in the order of having the same workplace environment and having a smaller number of other workplace environments based on the information generated by the NW ensuring unit.

A first workplace environment setting program according to an exemplary aspect of the invention operable on a computer forming a management server which manages setting of a plurality of virtual desktop environment servers each including a virtual desktop environment in which a workplace environment is generated in a virtual machine and setting of the virtual desktop environment, wherein the workplace environment setting program causes the computer to execute an OS sorting unit to execute OS sorting processing of generating information of an OS sorting result obtained by sorting the virtual desktop environment servers in the order of failing to have a virtual machine whose OS is other than OS of a virtual machine to be newly created, and a VM creating unit to execute VM creating processing of determining the virtual desktop environment server in which the virtual machine is to be created based on the OS sorting result information by giving preference to the virtual desktop environment server failing to have the virtual machine having that other OS.

The present invention enables a virtual machine to be optimally located based on characteristics of server virtualization.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a diagram showing a table arrangement of a data base according to the first exemplary embodiment of the present invention;

FIG. 16 is a diagram showing a table arrangement of a data base according to the background art.

EXEMPLARY EMBODIMENT

Figure 1:
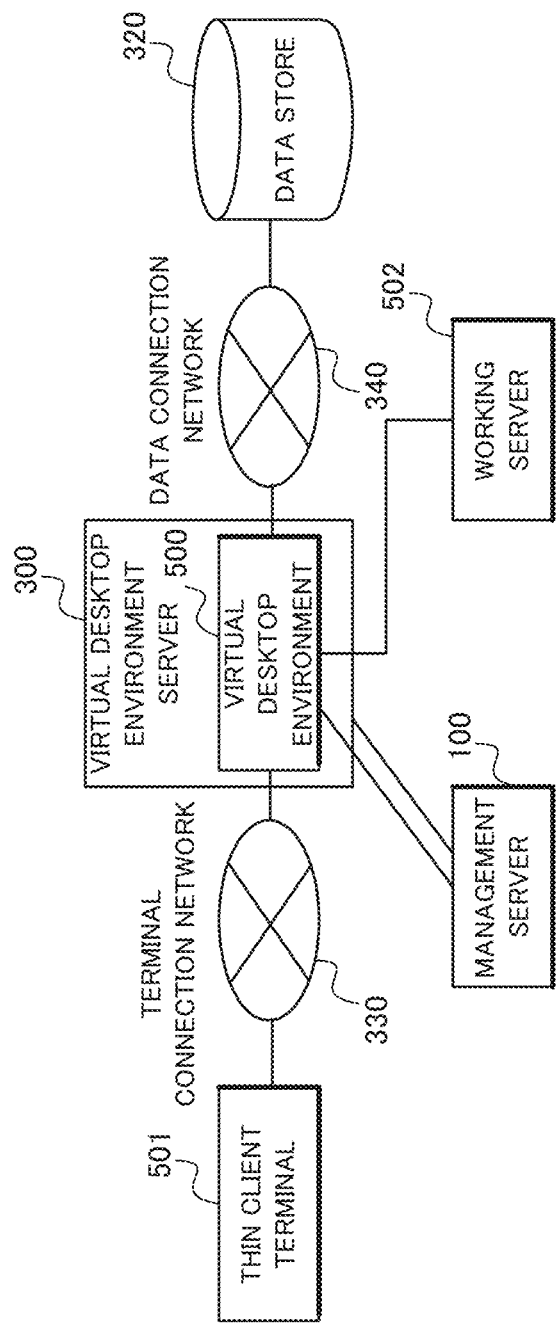
FIG. 1 is a block diagram showing a structure of a thin client system according to a first exemplary embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In order to clarify the foregoing and other objects, features and advantages of the present invention, exemplary embodiments of the present invention will be detailed in the following with reference to the accompanying drawings. Other technical problems, means for solving the technical problems and functions and effects thereof other than the above-described objects of the present invention will become more apparent from the following disclosure of the exemplary embodiments.

In all the drawings, like components are identified by the same reference numerals to appropriately omit description thereof.

First Exemplary Embodiment

First exemplary embodiment of the present invention will be detailed with reference to the drawings.

First, description will be made of terms.

"Workplace environment setting" represents that working can be executed in a desktop environment, so that a system is in a state where network setting allowing connection to a workplace server is established to have a business application installed.

"Virtual desktop environment (VD)" represents that a desktop environment on PC for the execution of workplace is realized on a virtual machine, so that a workplace environment is set on the virtual machine.

"Virtual desktop environment server (VDS)" represents a server which provides a virtual desktop environment, so that a workplace environment is set on a hypervisor which operates a virtual machine.

FIG. 1 is a block diagram showing a structure of a thin client system 10 according to the first exemplary embodiment of the present invention.

With reference to FIG. 1, the thin client system 10 according to the present exemplary embodiment comprises a thin client terminal 501, a virtual desktop environment server 300 including a virtual desktop environment 500, a management server 100, a working server 502 and a data store 320.

The management server 100 sets the virtual desktop environment server 300 and the virtual desktop environment 500.

The virtual desktop environment server 300 connects to the data store 320 such as a storage through a data connection network 340 such as SAN (Storage Area Network).

The virtual desktop environment server 300 connects to the thin client terminal 501 through a terminal connection network 330. Therefore, the thin client terminal 501 connects to the virtual desktop environment 500 by screen transfer or the like. The virtual desktop environment 500 connects to the working server 502 to execute working.

Figure 2:
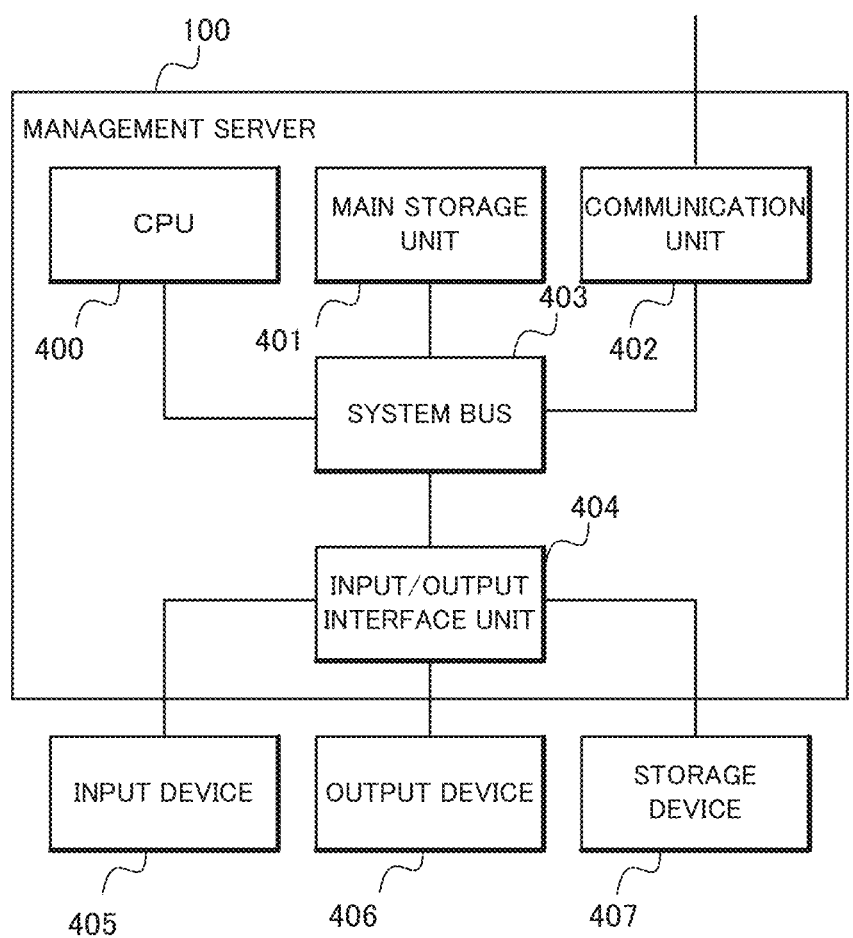
FIG. 2 is a block diagram showing a hardware configuration of a management server according to the first exemplary embodiment of the present invention.

FIG. 2 shows a hardware configuration of the management server 100. FIG. 2 shows a common computer configuration including a CPU 400, a main storage unit 401, a communication unit 402 and an input/output interface unit 404 which are connected through a system bus 403, and an input device 405, an output device 406 and a storage device 407 which are connected to the input/output interface unit 404. Use of the communication unit 402 enables communication with a computer external to the management server 100.

Figure 3:
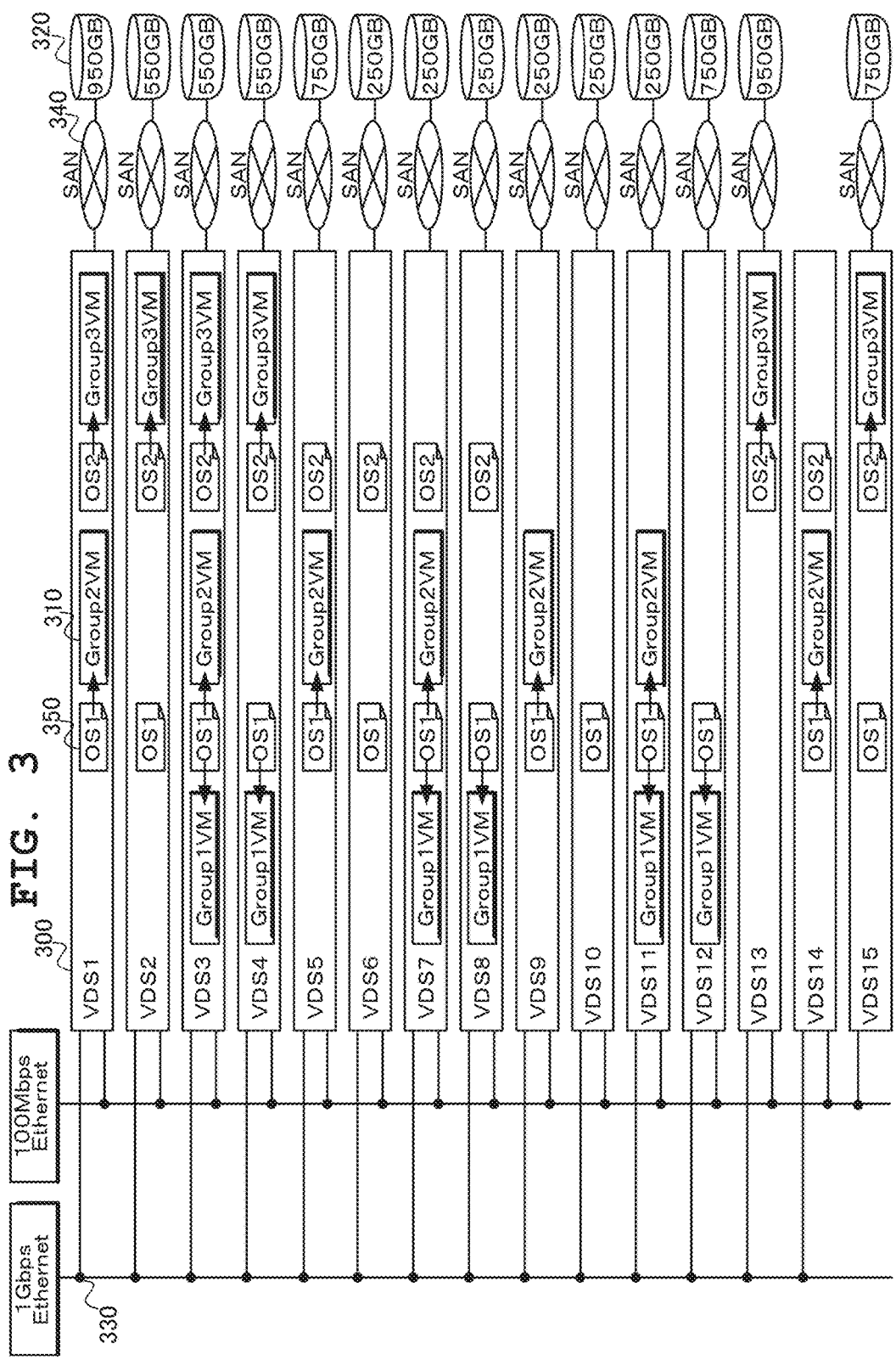
FIG. 3 is a diagram showing an arrangement example of a VDS environment according to the first exemplary embodiment of the present invention.

FIG. 3 shows a VDS environment handled by the present invention. Shown in FIG. 3 is a template 350 of OS of a virtual machine (VM) which can be handled by the virtual desktop environment server 300, a virtual machine (VM) 310 created based on the OS template 350, the terminal connection network 330 through a physical NIC of the hypervisor, the data connection network 340 of the hypervisor, and the storage 320.

Character string described in the virtual machine 310 represents a workplace environment, and it is shown, for example, that the virtual machine 310 of a VDS1 has workplace environments (Group 2VM, Group 3VM) of Group 2 and Group 3.

The virtual machine 310 connects to the working server 502 through a network whose segments are separated by a VLAN, for example. While in terms of use of a business application, the virtual machine 310 is handled as the virtual desktop environment 500, it will be considered to be the virtual machine 310 for the description to be mainly made of an entity created from the template 350. Hereafter, description will be here made of the virtual desktop environment 500 unless the virtual machine 310 in itself is handled.

Figure 4:
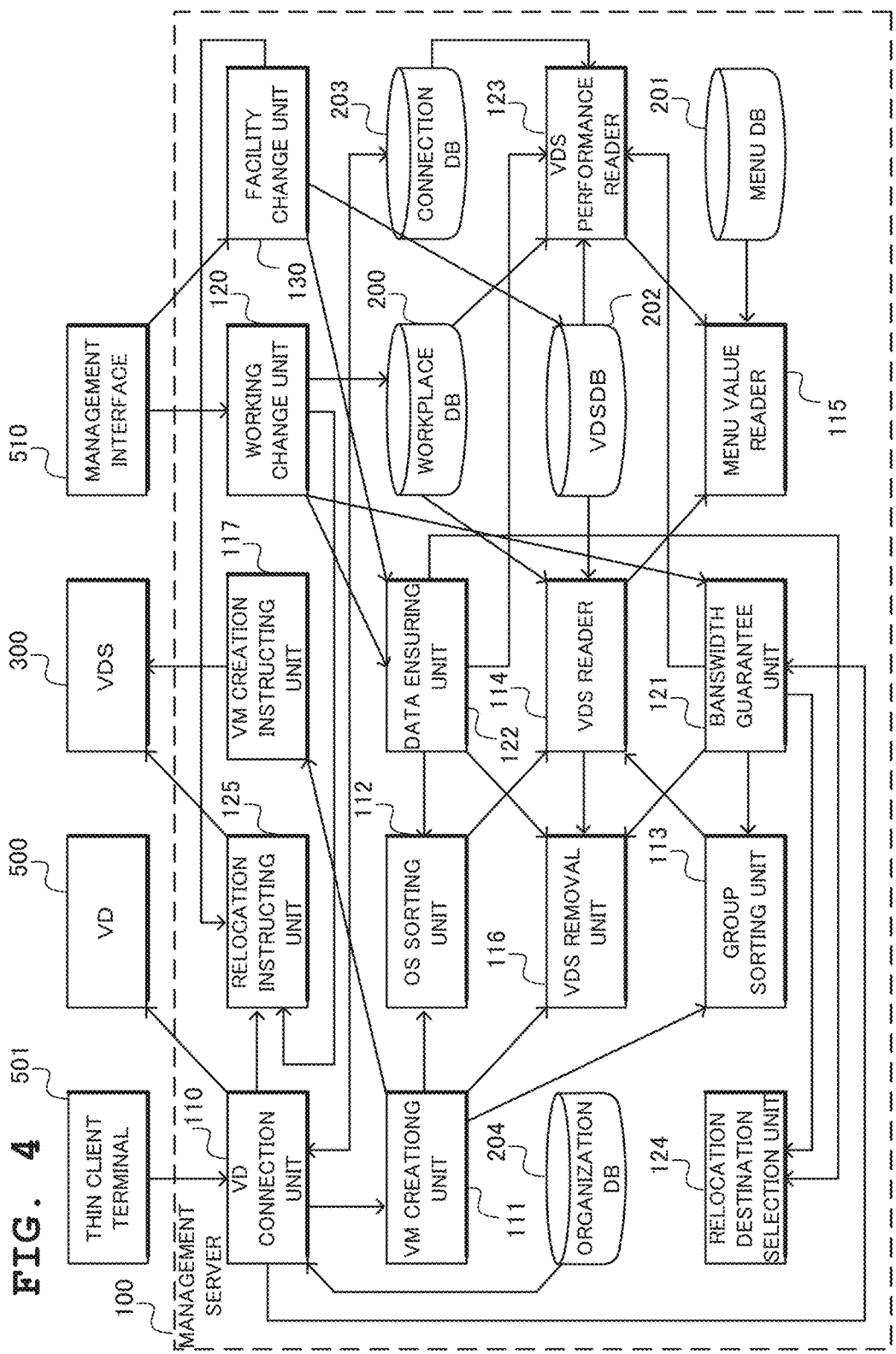
FIG. 4 is a block diagram showing a structure of the management server according to the first exemplary embodiment of the present invention.

FIG. 4 is a block diagram showing a structure of the management server 100 according to the present exemplary embodiment. In the following, each function of the management server will be described with reference to FIG. 4.

(Functional Block for Use when Using Management Server from Outside)

First, as a functional block for use when the management server 100 is externally used, description will be made of a VD connection unit 110, a workplace change unit 120 and a facility change unit 130.

The VD connection unit 110 receives a VD connection request from a user as "User" from the thin client terminal 501, refers to the organization DB 204 to obtain "Group" and obtain a connection DB 203 corresponding to the "Group".

Check a connection situation of each resultant virtual desktop environment 500 and if no free virtual desktop environment 500 exists, create the virtual machine 310 by a VM creating unit 111. Then, obtain the virtual desktop environment 500 to relocate by a Bandwidth guarantee unit 121 and relocate each virtual desktop environment 500 by a relocation instructing unit 125, thereby setting a workplace environment of the virtual desktop environment 500 so as to maintain a band.

When terminal connection as default is changed, the workplace change unit 120 receives "Group of workplace environment" and "value as of after change" from a management interface 510 and obtains "workplace environment" from a workplace DB 200, the Bandwidth guarantee unit 121 obtains the virtual desktop environment 500 to relocate, and the relocation instructing unit 125 relocates each virtual desktop environment 500, thereby setting a workplace environment of the virtual desktop environment 500 so as to maintain a band.

When data connection as default is changed, the workplace change unit 120 receives "Group of workplace environment" and "value as of after change" from the management interface 510 and obtains "workplace environment" from the workplace DB 200, a data ensuring unit 122 obtains the virtual desktop environment 500 to relocate, and the relocation instructing unit 125 relocates each virtual desktop environment 500, thereby setting a workplace environment of the virtual desktop environment 500 so as to maintain data connection.

The facility change unit 130, which is a block for use in storage addition, receives "VDS" and "value of SAN as of after expansion" from the management interface 510, the data ensuring unit 122 obtains the virtual desktop environment 500 whose workplace environment can be set to data default from data spare, and the relocation instructing unit 125 relocates each virtual desktop environment 500, thereby switching data connection from a file server to SAN.

(Functional Block for Use when Using External Structure Block)

Next, description will be made of a VM creation instructing unit 117, the VM creating unit 111 and the relocation instructing unit 125 as a functional block for use when using an external structure block from the management server 100.

The VM creation instructing unit 117 receives "creation destination VDS" and "OS" from the VM creating unit 111 to instruct the virtual desktop environment server 300 to create the virtual machine 310 for the virtual desktop environment 500 by using a template of a designated OS.

The VM creating unit 111 receives "Group" from the VD connection unit 110, obtains a sorting result of an OS sorting unit 112 and a sorting result of a Group sorting unit 113, uses a VDS removal unit 116 to remove the virtual desktop environment server 300 which cannot be set because of default terminal connection/data connection, unifies VDS sorting results while giving preference to the sorting result of the OS sorting unit 112 and designates the top of the VDS sorting result and OS of the Group of the workplace environment to the VM creation instructing unit 117 to create the virtual machine 310.

The relocation instructing unit 125 receives "VD to be relocated", "VDS from which relocation is made", "relocation destination VDS", "terminal connection setting" and "data connection setting" from the VD connection unit 110 or the workplace change unit 120 or the facility change unit 130 to execute relocation of the virtual machine 310 and workplace environment setting of the virtual desktop environment 500 at the relocation destination.

(Functional Block Internally Executing Common Processing)

Next, description will be made of the VDS removal unit 116, a relocation destination selection unit 124, a VDS reader 114, a VDS performance reader 123 and a menu value reader 115 as a functional block which executes common processing in the management server 100.

The VDS removal unit 116 receives "VDS list" and "removal option" and returns a VDS list excluding a VDS relevant to the removal option. Four kinds can be set as removal options to be selected, "no OS template in VDS", "default terminal connection not allowed to VDS", "default data connection not allowed to VDS" and "VDS has no Group".

The relocation destination selection unit 124 receives a list of "predicted value as of after relocation" and "list of VDs yet to be relocated" arranged on a VDS basis, selects a list of VDs to relocate from the list of VDs yet to be relocated such that a predicted value as of after relocation will not be a negative value, creates a list of VDs to be relocated and returns the same to a relocation destination VDS.

The VDS reader 114 receives "Group" from the OS sorting unit 112 or the Group sorting unit 113, obtains workplace from the workplace DB 200 and obtains all VDSs from a VDS DB 202, the menu value reader 115 obtains values of terminal connection and data connection corresponding to the workplace and creates data to be processed by the VDS removal unit 116, the OS sorting unit 112 and the Group sorting unit 113 in the creation of a VDS list, and the VDS removal unit 116 removes a VDS having no template of OS and returns the data in a table form.

The VDS performance reader 123 receives "Group" from the Bandwidth guarantee unit 121 or the data ensuring unit 122, obtains workplace from the workplace DB 200, obtains values of terminal connection and data connection corresponding to the workplace from the menu value reader 115, obtains a list of VDs on a VDS basis from the connection DB 203, obtains all the VDSs from the VDS DB 202, creates return data including a menu value and a VD list arranged on a VDS basis and returns the same as data in a table form.

The menu value reader 115 receives "workplace environment" equivalent to a relevant Group row of the workplace DB from the VDS reader 114 or the VDS performance reader 123 to return a workplace environment whose menu name of Type corresponding to the column of the workplace DB is replaced by a performance value.

(Functional Block which Solves Problems)

Next, description will be made of the OS sorting unit 112, the Group sorting unit 113, the Bandwidth guarantee unit 121 and the data ensuring unit 122 as a functional block which solves the problems of the present invention in the management server 100.

The OS sorting unit 112 receives "Group" from the VM creating unit 111 or the data ensuring unit 122, obtains data for processing from the VDS reader 114 and in order to attain the first solution, sorts and returns VDSs such that a hypervisor having a different OS is unlikely to be selected.

The Group sorting unit 113 receives "Group" from the VM creating unit 111 or the data ensuring unit 122, obtains data for processing from the VDS reader 114 and in order to attain the second solution, sorts and returns VDSs such that a hypervisor having the same workplace environment is highly likely to be selected.

The Bandwidth guarantee unit 121 receives "Group" from the workplace change unit 120 or the VD connection unit 110, sorts the list obtained by the VDS performance reader 123 according to predicted values as of after relocation, and obtains a Group sorting result from the Group sorting unit 113, so that the VDS removal unit 116 removes a VDS without Group to unify the obtained list and the sorting result while giving preference to the Group sorting result. Then, the relocation destination selection unit 124 selects a VD to be relocated, and in order to attain the fourth solution, selects VD having other data connection than default to be set as a constraint and returns the results in a table form which can be handled by the relocation instructing unit 125.

The data ensuring unit 122 receives "Group" from the workplace change unit 120 or the facility change unit 130, sorts the list obtained by the VDS performance reader 123 according to predicted values as of after relocation, and obtains an OS sorting result from the OS sorting unit 112, so that the VDS removal unit 116 removes VDS which is not allowed default terminal connection to unify both results while giving preference to the OS sorting result. Then, the relocation destination selection unit 124 selects a VD to be relocated, and in order to attain the third solution, selects a VD having other band than default to be set as a constraint and returns the result in a table form which can be handled by the relocation instructing unit 125.

(Data Structure of Management Server)

Lastly, description will be made of the workplace DB 200, a menu DB 201, the VDS DB 202, the connection DB 203 and the organization DB 204 as data structure handled in the management server 100.

The workplace DB 200, which is a part of units for attaining the fifth solution, has four columns added to the workplace DB 210 of the background art. To be set as a workplace environment and a constraint are columns of NW default and NW spare for "terminal connection" and columns of Data default and Data spare for "data connection". When the workplace environment and constraint are set, take a value of the menu name column of the menu DB 201. When they are not set, take other value than a menu name. The value may be expressed, for example, by a character string of one character of an en hyphen.

The menu DB 201, which is another part of the units for attaining the fifth solution, expresses "NW menu" and "data connection menu" having minute set values. In the Type column, a NW or Data value can be Enums, for example, and in a case of NW, values can be set in the columns of NW default and NW spare in the workplace DB 200 and in a case of Data, values can be set in the columns of Data default and Data spare in the workplace DB 200. The menu name column has a value for the selection in the workplace DB, which is expressed by a character string such as Gold or Basic. Menu content shows character string data for explaining a NW menu/data connection menu which can be used as required as a subsidiary for selecting a menu in a workplace environment. Performance value column represents data for use in sorting VDSs, which is expressed by numerical data with a code, for example.

The VDS DB 202 has the following information for all the VDSs.

OS column represents OS having a template on a VDS by an ID for identifying OS, for example.

Group column represents a Group having VM of a workplace environment by an ID for identifying a Group column of a workplace environment, for example.

Two columns of NIC1 and NIC2 represent performance of a physical NIC of a hypervisor by numerical data without a code, for example, in which no NIC is assumed to be 0 and expressed by one character of an en hyphen.

Total band column and a free band column handle information for terminal connection, and an entire SAN column and an SAN remaining band column handle information for data connection, which are represented by numerical data without a code, for example. No SAN connection is assumed to be 0 which is expressed by "none". The free band column represents a band reflecting the number of VDs for each workplace environment which is obtained from the connection DB out of the total band. The SAN remaining band column represents a capacity reflecting the number of VDs for each workplace environment which is obtained from the connection DB out of the entire SAN.

With an ID for identifying the Group column of a workplace environment and an ID for identifying VDS as keys, the connection DB 203 has a list of VDs existing in the VD column in a form of a list, for example. In a default column of the connection DB 203, being NW default and Data default is represented by a Boolean value of YES/NO, for example. The default value being YES represents being NW default and Data default and being NO represents that at least one of them is spare.

The organization DB 204, similarly to the background art, represents that to a Group column indicative of an arbitrary organization, a User column indicative of an arbitrary user belongs.

At the time of virtual machine creation, thus structured present invention preferentially selects a hypervisor as a VM creation destination in the order, no virtual machine of other OS existing, no template of other OS existing, the same workplace environment existing and few other workplace environments existing.

At the time of terminal connection change of a workplace environment, preferentially select a hypervisor of a VD relocation destination in the order, having the same workplace environment, having few different workplace environments and band having room, and when data connection is impossible at a VD relocation destination, switch to the file server.

At the time of data connection change of a workplace environment, preferentially select a hypervisor of a VD relocation destination in the order, no virtual machine of other OS existing, no template of other OS existing and free space of the storage being large, and when a band runs short at a VD relocation destination, limit the band.

(Description of Operation of the First Exemplary Embodiment)

Next, operation of the thin client system 10 according to the present exemplary embodiment will be detailed with reference to the drawings.

Figure 6:
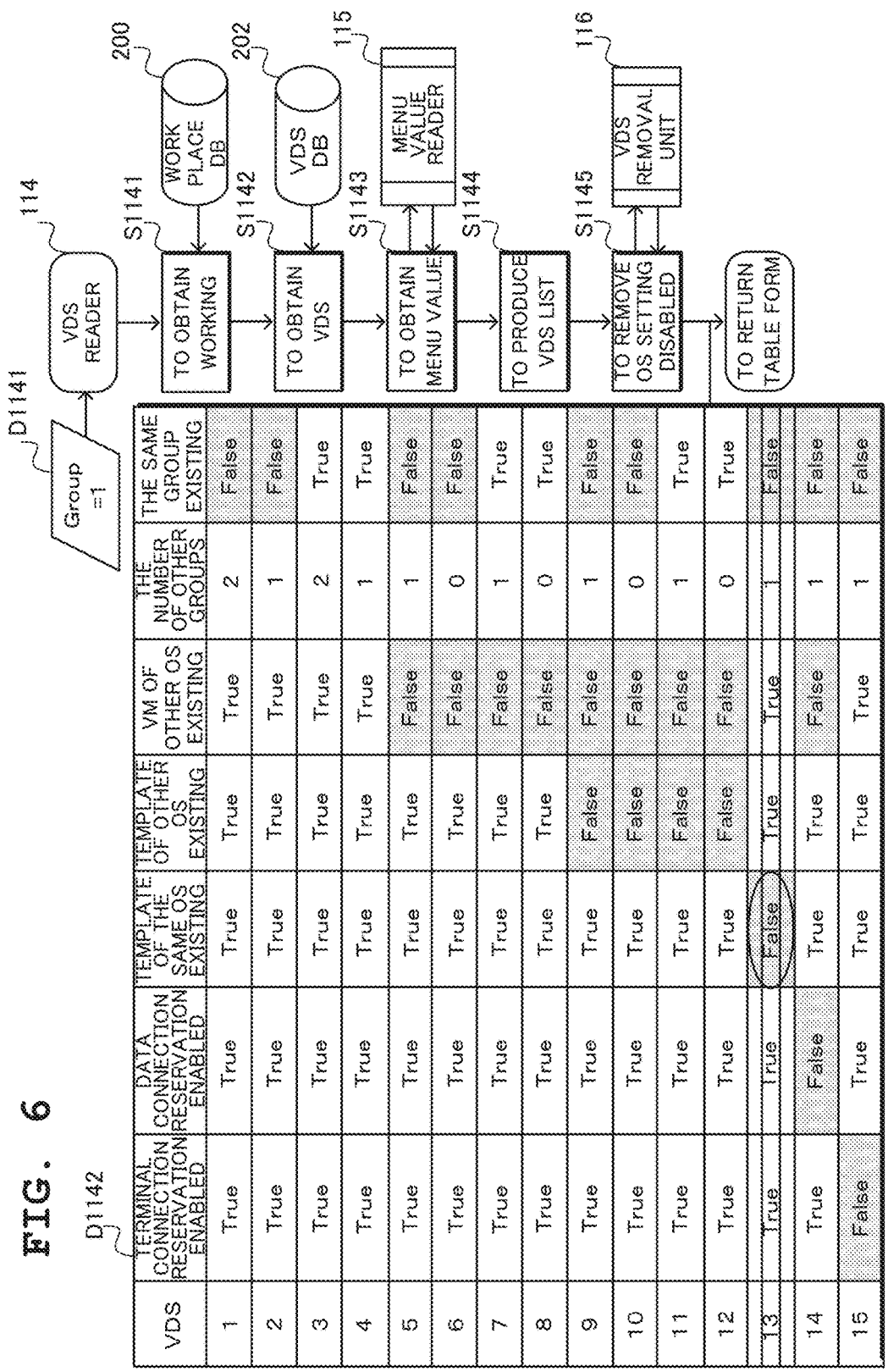
FIG. 6 is a diagram showing operation of a VDS reader according to the first exemplary embodiment of the present invention.

FIG. 6 shows operation of the VDS reader 114. The VDS reader 114 receives Group=1D1121 as an argument.

First, obtain a row of Group=1 in the workplace DB 200 as a workplace environment in workplace acquisition at S1141. On this occasion, obtain other workplace environments as well.

Next, obtain all the rows of the VDS DB 202 in VDS acquisition at S1142.

Next, set a menu value of the workplace environment to a performance value in menu value acquisition at S1143.

Next, create data in a table form for return in VDS list creation at S1144.

Lastly, in OS setting disabled removal at S1145, remove a row in which the column of Template of the same OS existing indicates False in return data D1142.

Detailed operation of VDS list creation at S1144 shown in FIG. 6 is as follows.

First, prepare a row of a VDS list.

Secondly, add a column of terminal connection reservation enabled represented by a Boolean value, for example, to the right end, in which when either NIC1 or NIC2 of VDS is not more than NW default of the workplace environment, set True and otherwise set False.

Thirdly, add a column of data connection reservation enabled represented by a Boolean value, for example, to the right end, in which in a case where Data default of the workplace environment is SAN, when the entire SAN of the VDS DB is not none and in a case where the same is a file server, when VDS DB has the second NIC, set True and otherwise set False.

Fourthly, add a column of Template of the same OS existing represented by a Boolean value, for example, to the right end, in which when the OS column of the VDS DB has the template OS=1 represented in the OS column of the workplace environment, set True and otherwise set False.

Fifthly, add a column of Template of other OS existing represented by a Boolean value, for example, to the right end, in which when the OS column of the VDS DB has other than the template OS=1 represented in the OS column of the workplace environment, set True and otherwise set False.

Sixthly, add a column of VM of other OS existing represented by a Boolean value, for example, to the right end, obtain OS by using the workplace environment obtained in the workplace acquisition at S1141 from the Group column of the VDS DB, and when OS other than OS=1 corresponding to Group=1 exists, set True and otherwise set False.

Seventhly, add a column of the number of other Groups represented by an integer value without a code, for example, to the right end, in which set other numerical values than Group=1 in the column of Group of the VDS DB.

Eighthly, add a column of the same Group existing represented by a Boolean value, for example, to the right end, in which set True when the column of Group of the VDS DB has Group=1 and otherwise, set False.

Figure 7:
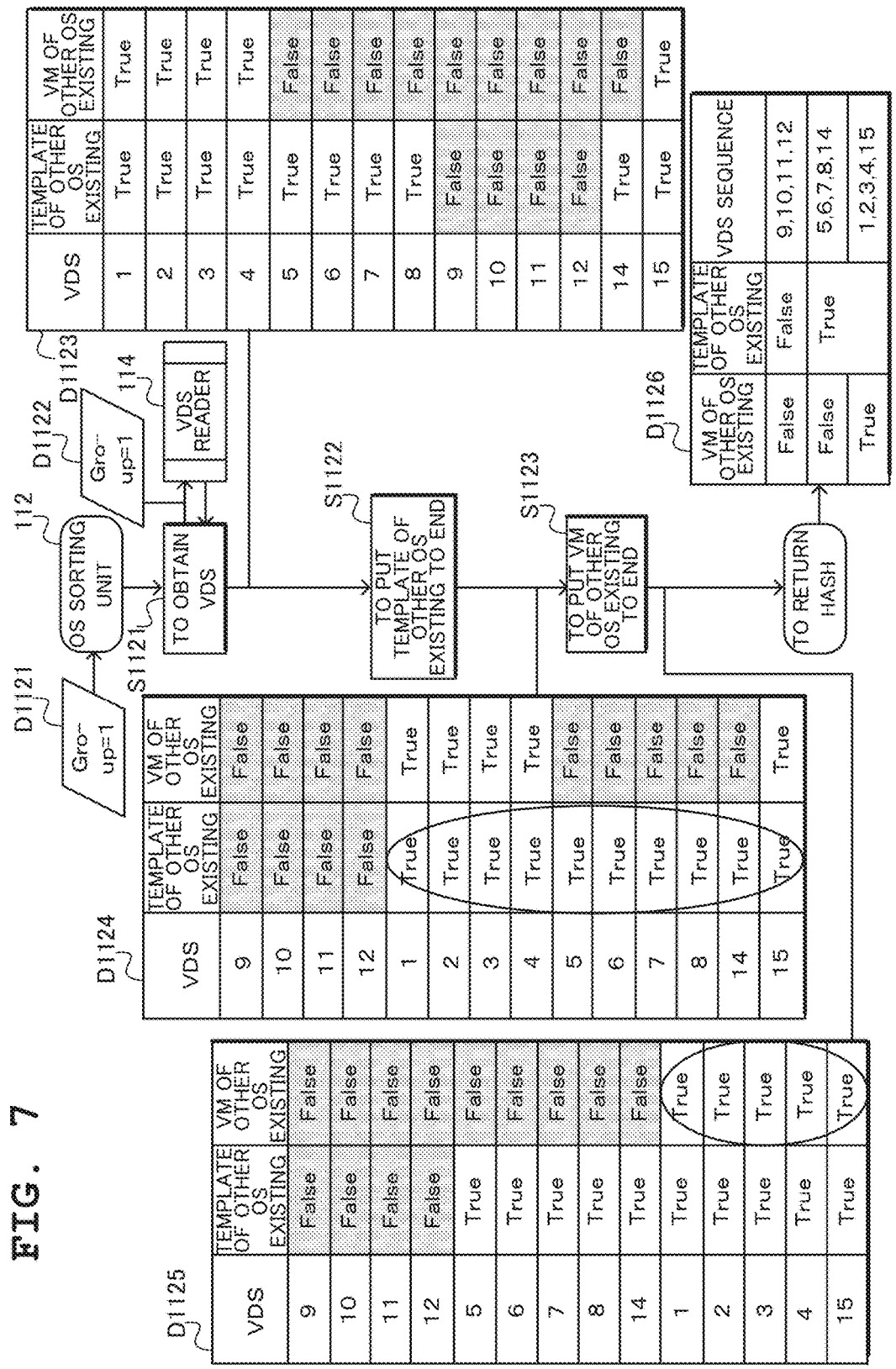
FIG. 7 is a diagram showing operation of an OS sorting unit according to the first exemplary embodiment of the present invention.

FIG. 7 shows operation of the OS sorting unit 112. The OS sorting unit 112 receives Group=1 as an argument.

First, obtain data for processing in VDS acquisition at S1121. At this time point, the data limited to a column of VDS, a column of Template of other OS existing, and a column of VM of other OS existing will be D1123.

Next, rearrange the column of Template of other OS existing which indicates True to the end at S1122 for rearranging Template of other OS existing to the end. At this time point, the data limited to the column of VDS, the column of Template of other OS existing, and the column of VM of other OS existing will be D1124.

Next, rearrange the column of VM of other OS existing which indicates True to the end at S1123 for rearranging VM of other OS existing to the end. At this time point, the data limited to the column of VDS, the column of Template of other OS existing, and the column of VM of other OS existing will be D1125.

Lastly, return data D1126 in a hash form such that the lump sorted at S1122 and S1123 can be seen.

Figure 8:
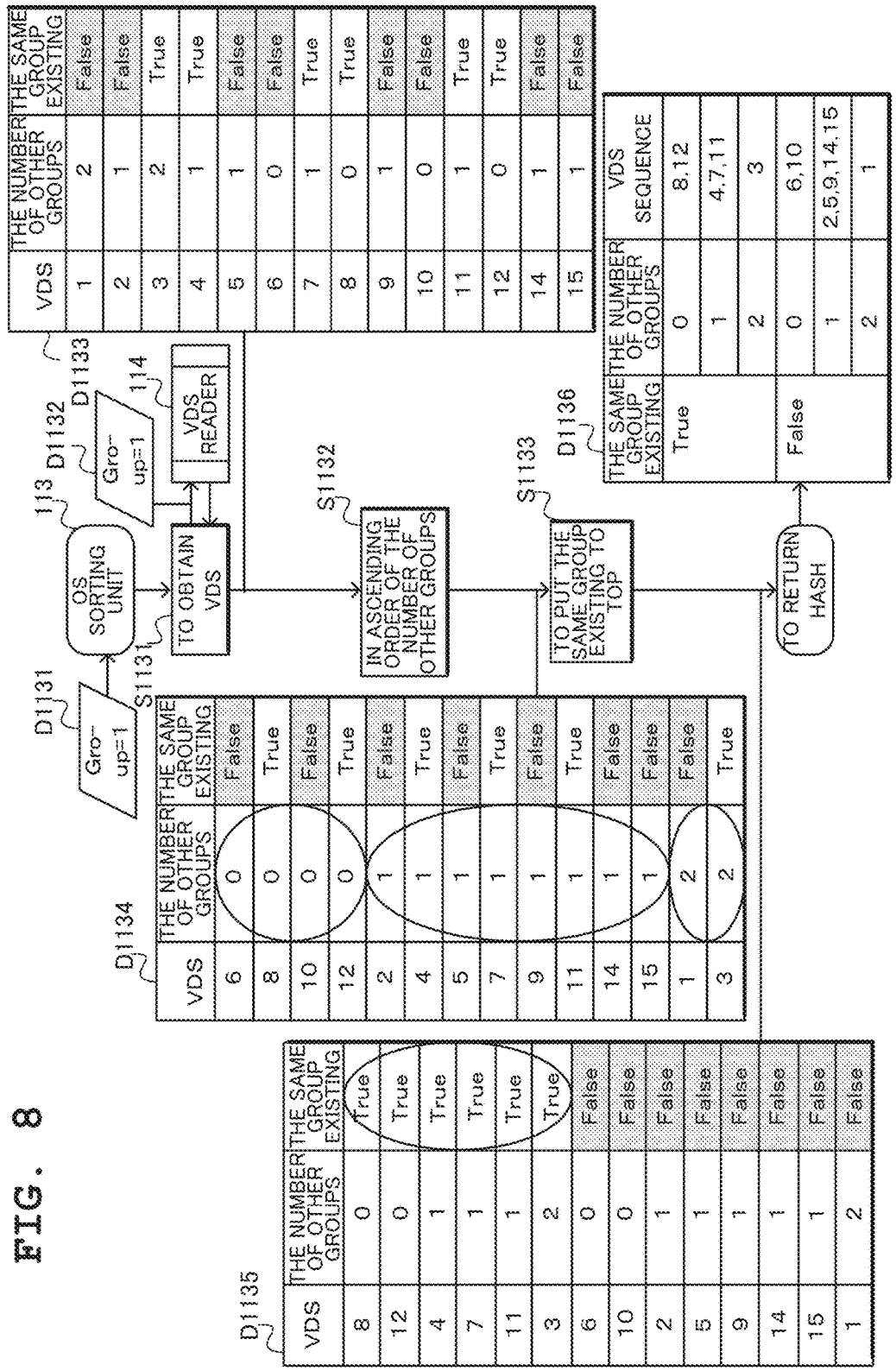
FIG. 8 is a diagram showing operation of a Group sorting unit according to the first exemplary embodiment of the present invention.

FIG. 8 shows operation of the Group sorting unit 113. The Group sorting unit 113 receives Group=1 as an argument.

The Group sorting unit 113 first obtains data for processing in VDS acquisition at S1131. At this time point, the data limited to a column of VDS, a column of the number of other Groups and a column of the same Group existing will be D1133.

Next, rearrange the VDSs in ascending order of the number of other Groups at S1132 for arrangement in ascending order of the number of other Groups. At this time point, the data limited to the column of VDS, the column of other Groups and the column of the same Group existing will be D1134.

Next, at S1133 for putting the same Group to the top, rearrange the column of the same Group existing which indicates True to the top. At this time point, the data limited to the column of VDS, the column of other Groups and the column of the same Group existing will be D1135.

Lastly, return data D1136 in a hash form such that the lump sorted at S1132 and S1133 can be seen.

Figure 9:
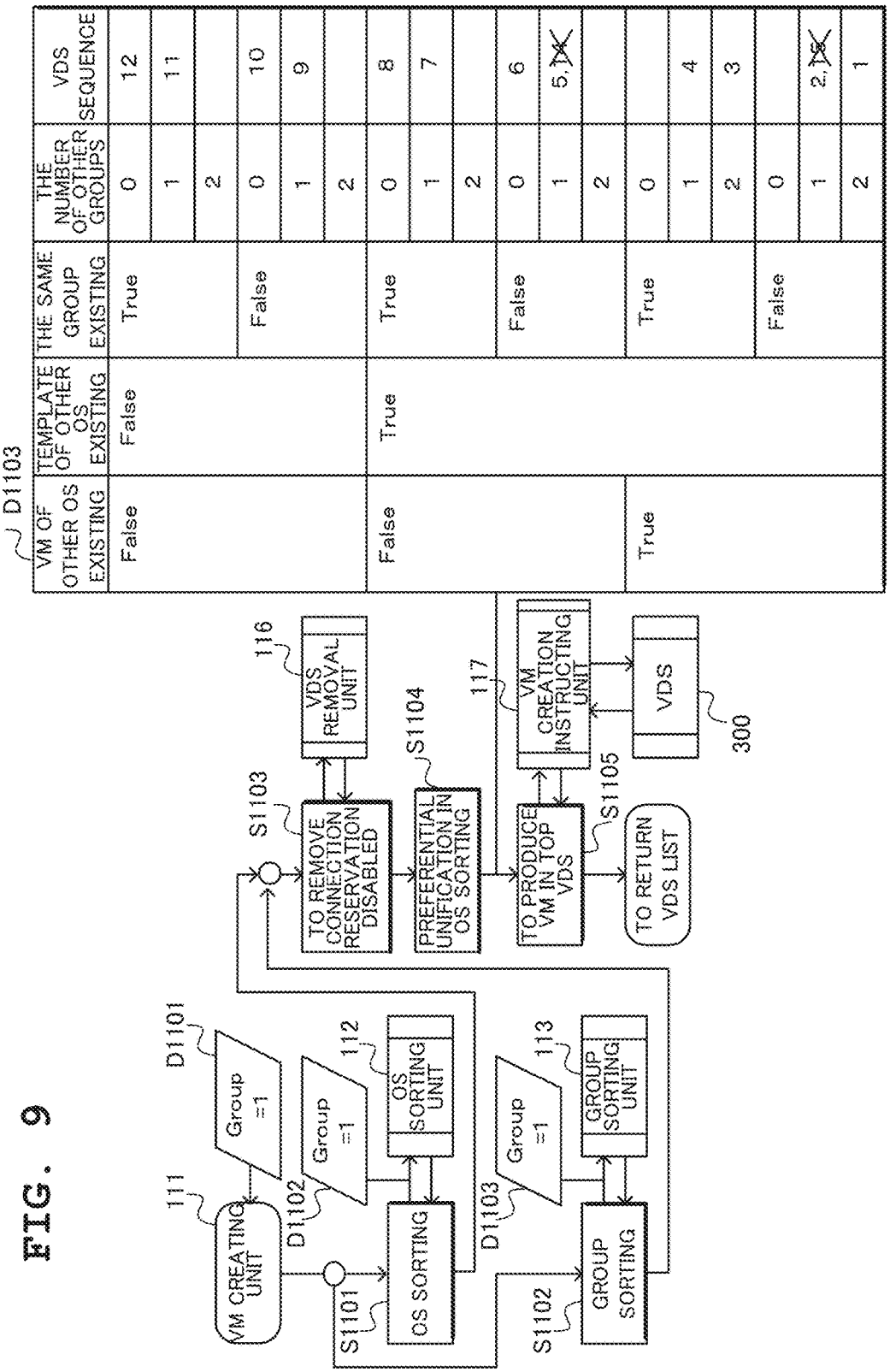
FIG. 9 is a diagram showing operation of a VM creating unit according to the first exemplary embodiment of the present invention.

FIG. 9 shows operation of the VM creating unit 111. The VM creating unit 111 receives Group=1 as an argument.

The VM creating unit 111 first causes OS sorting at S1101 and Group sorting at S1102 to operate in parallel to obtain the OS sorting result D1126 and the Group sorting result D1136.

Next, in connection reservation disabled removal at S1103, the VDS removal unit 116 removes a VDS 15 as the terminal connection reservation enabled column=False and a VDS 14 as the data connection reservation enabled column=False, respectively, based on these setting.

Next, sort the Group sorting result D1136 with respect to each lump of the OS sorting result D1126 by preferential unification in OS sorting at S1104. At this time point, the data will be such a sorting result of hash form as D1103.

Next, in VM creation at the top VDS at S1105, designate the top VDS 12 in D1103 and OS=1 as a template of the Group 1 and call up the VM creation instructing unit 117 to create VM. Lastly, return a list of VDSs including VDSs which can be set in addition to the VDS in which the VM is created.

Figure 10:
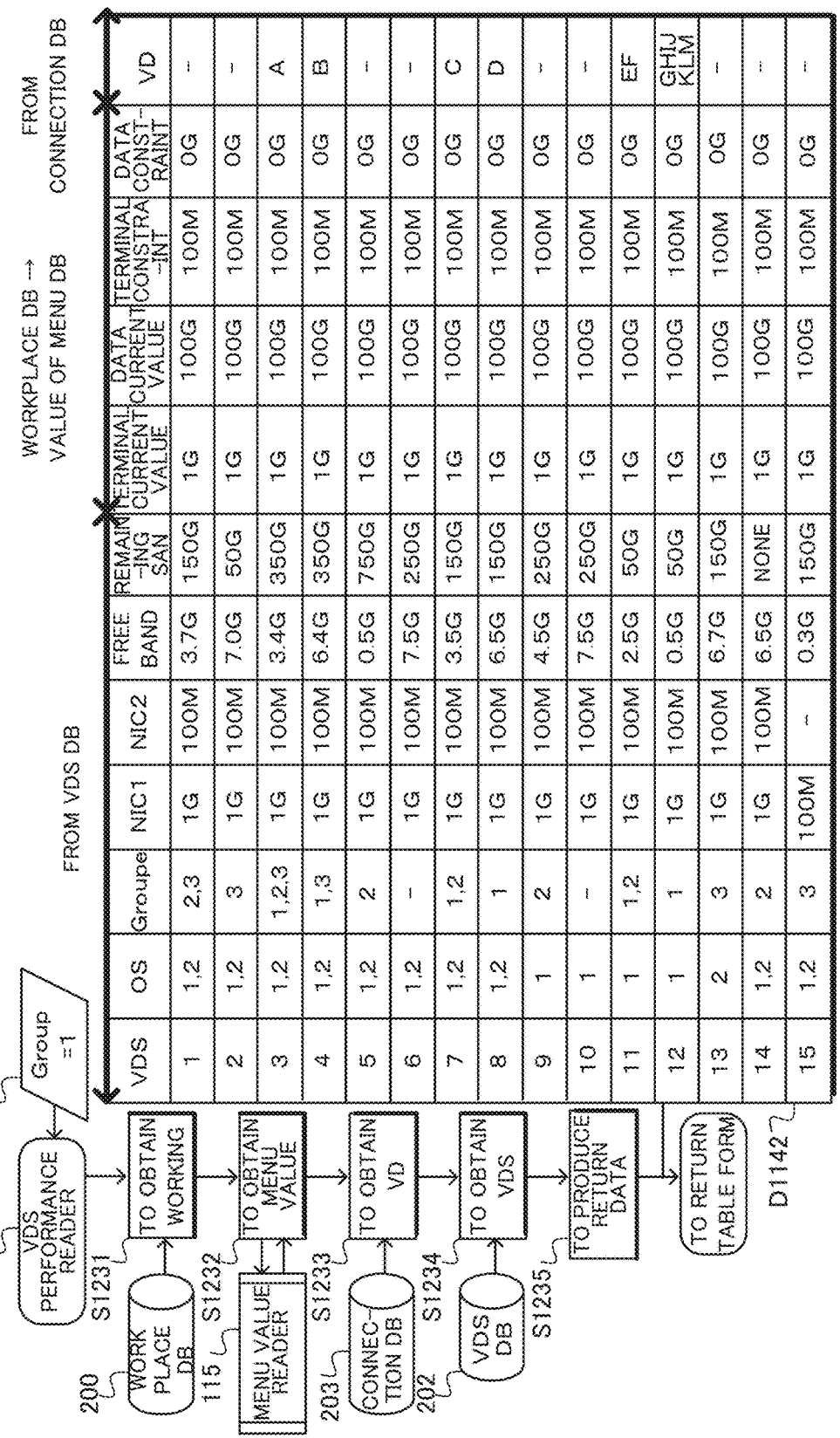
FIG. 10 is a diagram showing operation of a VDS performance reader according to the first exemplary embodiment of the present invention.

FIG. 10 shows operation of the VDS performance reader 123. The VDS performance reader 123 receives Group=1 as an argument.

The VDS performance reader 123 first obtains, as a workplace environment, the row of Group=1 of the workplace DB 200 in workplace acquisition at S1231.

Next, set a menu value of the workplace environment to a performance value in menu value acquisition at S1232.

Next, obtain the row of the connection DB corresponding to Group=1 in VD acquisition at S1233.

Next, obtain all the rows of the VDS DB in VDS acquisition at S1234.

Next, create return data in return data creation at S1235.

Detailed operation of return data creation at S1235 shown in FIG. 10 is as follows.

First, use the table of the VDS acquisition at S1234 as it is.

Secondly, add a column of terminal current values represented by a numerical value without a code, for example, to the right end, in which set a performance value of the NW default column of the workplace environment. On this occasion, when the default column of the connection DB indicates No, set a NW spare.

Thirdly, add a column of data current values represented by a numerical value without a code, for example, to the right end, in which set a performance value of the Data default column of the workplace environment. On this occasion, when the default column of the connection DB indicates No, set a Data spare.

Fourthly, add a column of terminal constraints represented by a numerical value without a code, for example, to the right end, in which set a performance value of the NW spare column of the workplace environment. On this occasion, when the default column of the connection DB indicates No, represent it by a character string of one character of an en hyphen, for example, without setting a value.

Fifthly, add a column of data constraints represented by a numerical value without a code, for example, to the right end, in which set a performance value of the Data spare column of the workplace environment. On this occasion, when the default column of the connection DB indicates No, represent it by a character string of one character of an en hyphen, for example, without setting a value.

Sixthly, add the VD column of the connection DB to the right end as it is. On this occasion, in a case of VDS having no VD existing, set no value and represent it by a character string of one character of an en hyphen, for example.

Figure 11:
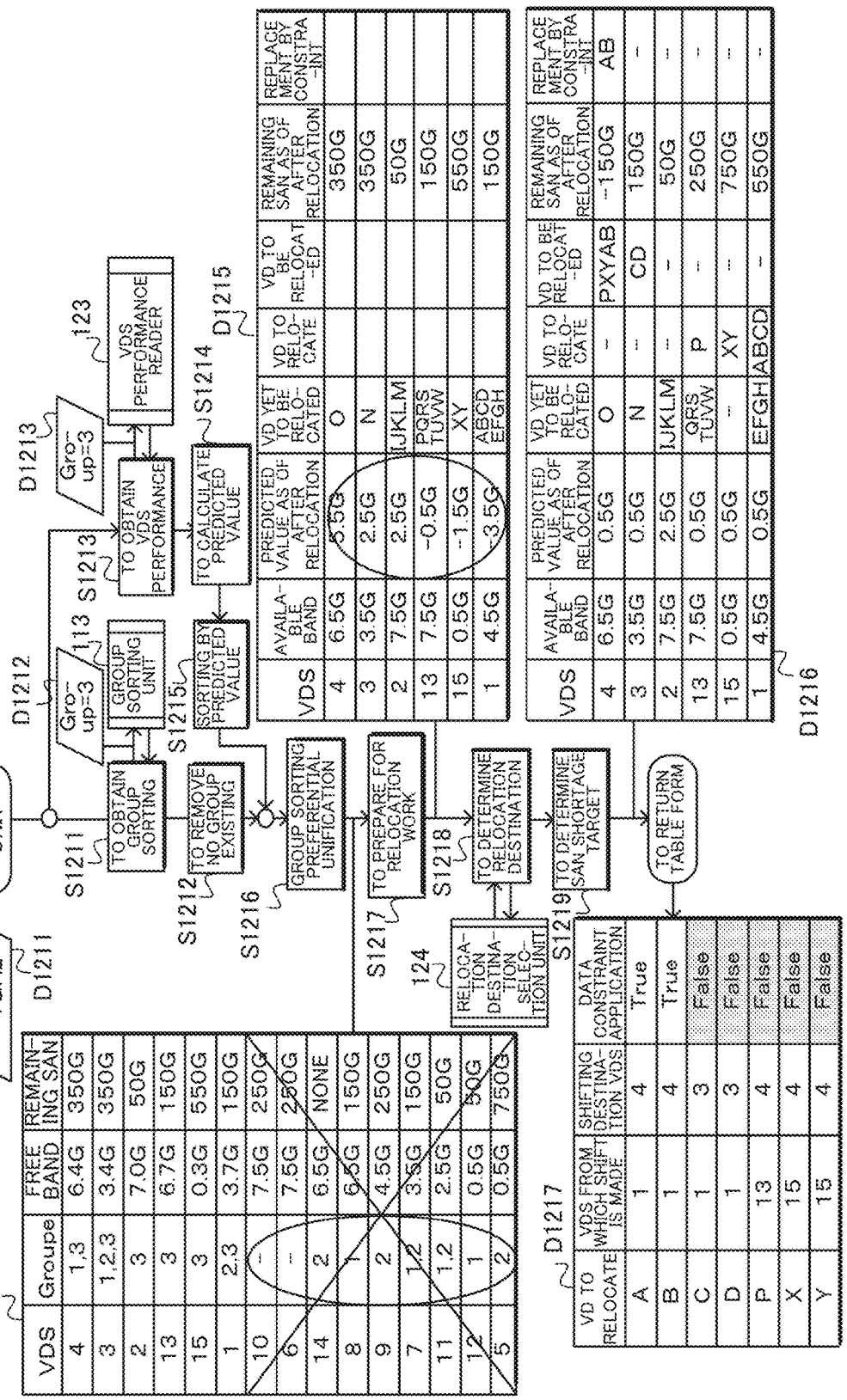
FIG. 11 is a diagram showing operation of a NW ensuring unit according to the first exemplary embodiment of the present invention.

FIG. 11 shows operation of the Bandwidth guarantee unit 121. The Bandwidth guarantee unit 121 receives Group=3 as an argument and Value=1 GHz as a value as of after change.

The Bandwidth guarantee unit 121 first causes Group sorting acquisition at S1211 and VDS performance acquisition at S1213 to operate in parallel to obtain a Group sorting result and the VDS performance list.

After the Group sorting acquisition at S1211, remove VDSs whose Group is not 3 by the VDS removal unit 116 in no Group removal at S1212. After the VDS performance acquisition at S1213, calculate a predicted value by using Value=1 GHz and the VD column as of no relocation in predicated value calculation at S1214. At this time point, the predicted value is a negative value.

Next, execute sorting in descending order of predicted values at S1215 for sorting by a predicted value. When two sorting results are prepared, in Group sorting preferential unification at S1216, sort Group sorting results according to the predicted value sorting results. At this time point, VDSs failing to have Group=3 are being removed to reside at the end of the list as shown in D1214 because of preference to Group sorting.

Next, in relocation work preparation at S1271, create data D1215 to be handled by the relocation destination selection unit 124. Next, by relocation destination determination at S1218, determine a relocation destination by the relocation destination selection unit 124.

Next, by SAN shortage target determination at S1219, set a data connection setting target caused by relocation to the column of replacement by data constraints. In the present exemplary embodiment, VDs to be relocated by the VDS4 will be five to make the column of the remaining SAN as of after relocation have a negative value, so that the target will be "A" and "B" which will be the VDs at the end before the value goes positive. Lastly, return data D1217.

Figure 12:
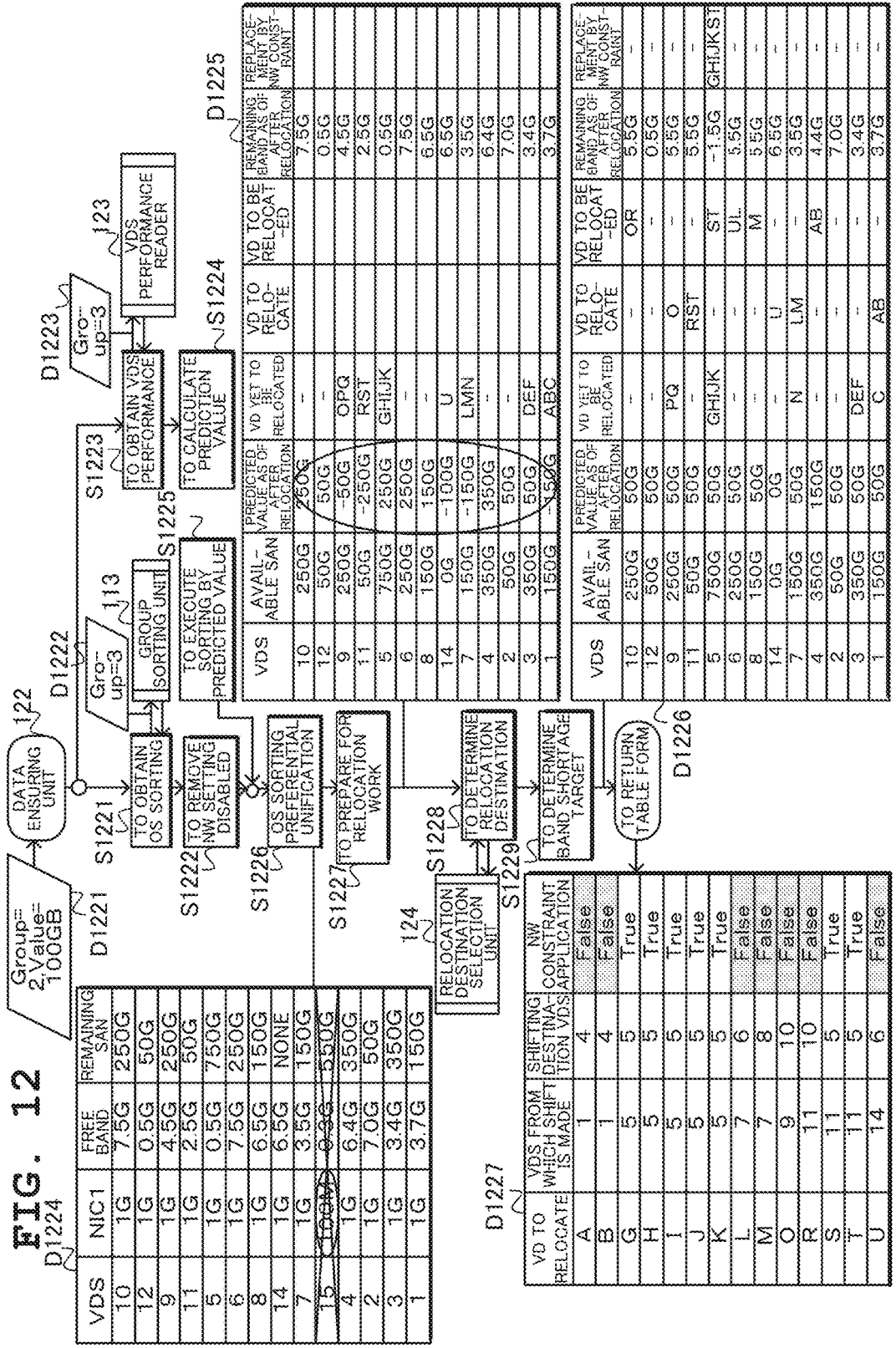
FIG. 12 is a diagram showing operation of a data ensuring unit according to the first exemplary embodiment of the present invention.

FIG. 12 shows operation of the data ensuring unit 122. The data ensuring unit 122 receives Group=2 as an argument and Value=100 GB as a value as of after change.

The data ensuring unit 122 first causes OS sorting acquisition at S1221 and VDS performance acquisition at S1223 to operate in parallel to obtain OS sorting result and the VDS performance list D1232.

After the OS sorting acquisition at S1221, in NW setting disabled removal at S1222, remove VDS whose workplace does not allow NW default setting by the VDS removal unit 116.

After the VDS performance acquisition at S1223, in predicted value calculation at S1224, calculate a predicted value by using Value=100 GB and the VD column as of no relocation. At this time point, the predicted value is a negative value.

Next, execute sorting in descending order of predicted values at S1225 for sorting by a predicted value. When two sorting results are prepared, in OS sorting preferential unification at S1226, sort the OS sorting results according to the predicted value sorting results. At this time point, NIC=100 MB which disables NW default setting is removed as shown in D1224 to result in being D1225 whose sorting is not simply in descending order of the predicted values because of preference to OS sorting.

Next, in relocation work preparation at S1227, create the data D1225 to be handled by the relocation destination selection unit 124.

Next, in relocation destination determination at S1228, determine a relocation destination by the relocation destination selection unit 124.

Next, in band shortage target determination at S1229, set a terminal connection setting target caused by relocation to the column of replacement by NW constraints. In the present exemplary embodiment, VDs to be relocated in the VDS5 will be two to make the column of the remaining band as of after relocation have a negative value, so that the target will be all of "G", "H", "I", "J" and "K" in the column of VD yet to be relocated and all of "S" and "T" in the column of VD to be relocated.

Lastly, return the data of D1227.

Figure 13:
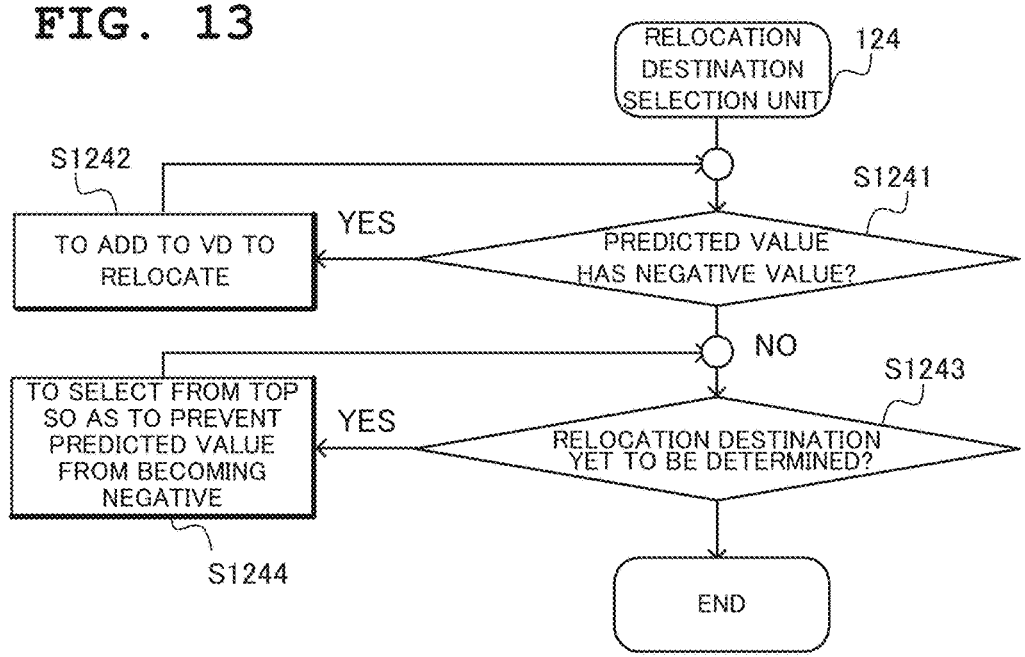
FIG. 13 is a diagram showing operation of a relocation destination selection unit according to the first exemplary embodiment of the present invention.

FIG. 13 shows operation of the relocation destination selection unit 124. The relocation destination selection unit 124 receives D1215 in FIG. 11 and D1225 in FIG. 12 as arguments.

At S1241 for checking whether predicated values include a negative value, the relocation destination selection unit 124 first checks whether the predicted value column as of after relocation in each row is negative.

When the condition holds, at S1242 for addition to a VD to be relocated, shift a VD at the top of the column of VD yet to be relocated to the column of VD to relocate to recalculate a predicted value as of after relocation. Continue this processing until the condition of S1241 fails to hold. At this time point, the column of VD to relocate is determined for each VDS but a relocation destination is yet to be determined.

Next, at S1243 for determining whether there exists a VD whose relocation destination is yet to be determined, check whether each VD in the column of VD to relocate exists in the column of VD to be relocated or not.

When the condition holds, select VDSs from the top so as to prevent a predicted value from being negative and at S1244 for selecting VDSs from the top so as to prevent a predicted value from being negative, add VD to the column of VD to be relocated and calculate a value of the column of remaining band as of after relocation or the column of remaining SAN as of after relocation. Continue the processing until the condition of S1243 fails to hold.

When applying the D1215 in FIG. 13, S1241 skips the processing of the VDS4, the VDS3 and the VDS2, and the VDS13 first proceeds to S1242 to add only "P" to the column of VD to relocate. Thereafter, in the VDS15, add "X" and "Y" and in the VDS1, add "A", "B", "C" and "D". At this time point, VDs whose relocation destinations are yet to be determined are "P", "X", "Y", "A", "B", "C" and "D".

S1243 will be repeatedly executed until such VD exists in the column of VD to be relocated. First, for "P", select the VDS4 at S1244, which will be repeated so as to prevent a predicted value as of after relocation from being negative, resulting in selecting the following "X", "Y", "A" and "B" for VDS4. At the subsequent "C", since a calculated predicted value of the VDS4 goes negative, select the subsequent VDS3 for "C". Also for the following "D", the VDS3 is appropriate. As a result, all the other columns than the column of replacement by data constraints will be set in D1216.

When the D1225 is applied in FIG. 13, the processing of S1241 skips the VDS10 and the VDS12, and the VDS9 first proceeds to S1242 to add only VD"O" to the column of VD to relocate. Thereafter, add "R", "S" and "T" in the VDS11, "U" in the VDS14, "L" and "M" in the VDS7 and "A" and "B" in the VDS1, respectively. At this time point, VD whose relocation destination is yet to be determined are "O", "R", "S", "T", "U", "L", "M", "A" and S1243 will be repeatedly executed until such VD exists in the column of VD to be relocated. First, for "O", select the VDS10 at S1244, which will be repeated so as to prevent a predicted value as of after relocation from being negative, resulting in selecting up to the subsequent "R" for the VDS10. At the subsequent "S", since a calculated predicted value of the VDS10 goes negative, check the following VDS12, VDS9 and VDS11 to select the VDS5. Thus, continue the processing until the last "B" is added to the column of VD to be relocated of the VDS4. As a result, all the other columns than the column of replacement by NW constraints will be set in D1226.

Blocks whose flow charts are not shown are a total of 7 blocks. Since these are not essential in terms of description of the present exemplary embodiment of the present invention, no description will be made thereof. Supplemental reason for omission of individual description is as follows.

As to all the three "functional blocks for use when using the management server from the outside" (the VD connection unit 110, the workplace change unit 120 and the facility change unit 130), their description will be omitted because they are for giving a trigger from outside the management server 100.

As to two of the three "functional blocks for use when using external structure block" (the VM creation instructing unit 117 and the relocation instructing unit 125), their description will be omitted because they are for operating the virtual desktop environment server 300.

As to two of the five "functional blocks internally executing common processing" (the VDS removal unit 116 and the menu value reader 115), their description will be omitted because they are related to only removal of a row and conversion of a value of a column, and sorting of a table is only preparation for the exemplary embodiment.

The present invention handles characteristics of server virtualization in terms of workplace environments disclosed in the related art to optimally locate a virtual machine based on the characteristics of the server virtualization. Therefore, similarly to the workplace DB 200 shown in FIG. 5, set the workplace DB 210 shown in FIG. 16 which represents the workplace environment of the background art to appropriately select the virtual desktop environment server (VDS) 300 by the creation of the virtual machine 310 or relocation of the same for the same environment shown in FIG. 3 as that of the background art. More specifically, optimum locating of virtual machines has five characteristics, four related to characteristics of server virtualization and one related to side effects of the present invention.

First, as to "increased memory efficiency realized by unification of a virtual machine OS", at the time of listing hypervisors usable as a workplace environment, the "OS sorting unit 112" is used such that a hypervisor having a different OS is unlikely to be selected. The OS sorting unit 112 sorts VDSs according to the OS of the template of VDS at the step of "putting other OS existing to the end". The OS sorting unit 112 also sorts VDSs according to OS of VM on VDS at the step of "putting VM of other OS existing to the end".

Secondly, as to "simplification of wiring realized by unification of virtual networks", at the time of listing hypervisors usable as a workplace environment, the "Group sorting unit 113" is used such that a hypervisor having the same workplace environment is likely to be selected. The Group sorting unit 113 sorts VDSs according to the number of workplace environments of VM on VDS at the step of "sorting in the ascending order of the number of other Groups". The Group sorting unit 113 also sorts VDSs according to a workplace environment of VM on VDS at the step of "putting the same Group to the top".

Thirdly, as to "band limitation by changing setting of a virtual machine NIC rate", the "data ensuring unit 122" is used which executes band limitation of a hypervisor on a workplace environment basis by setting a default band for each workplace environment and setting other band than a default band as a constraint. At the step of "OS sorting preferential unification", the data ensuring unit unifies results of VDSs sorted according to remaining band values and results obtained by the OS sorting unit 112. The data ensuring unit 122 selects a VD whose band limitation is to be executed among VDs to relocate at the step of "band shortage target determination".

Fourthly, as to "data preserving region realized by other virtual disk than a virtual machine OS region", the "Bandwidth guarantee unit 121" is used which sets default data connection for each workplace environment and sets other data connection than that of default as a constraint to enable a file server to be used for each workplace environment at the time of storage shortage. At the step of "Group sorting preferential unification", the Bandwidth guarantee unit 121 unifies results of VDSs sorted according to remaining data connection values and results obtained by the Group sorting unit 113. The Bandwidth guarantee unit 121 selects VD whose data connection is replaced by the file server among VDs to relocate at the step of "SAN shortage target determination".

Fifthly, as to "side effects of the invention", with "terminal connection" and "data connection" assumed to be set to a workplace environment and a constraint, refer to a "NW menu" and a "data connection menu" having minute set values. Terminal connection is represented as "NW default" and "NW spare" in the workplace DB, with a constraint represented as "NW spare". Data connection is represented as "Data default" and "Data spare" in the workplace DB, with a constraint represented as "Data spare". NW menu is represented as "NW" in Type in the menu DB. Data connection menu is represented as "Data" in Type in the menu DB.

(Effects Attained by the First Exemplary Embodiment)

VM creation at the time of VD connection has the following three effects. (1) VDS having other OS is unlikely to be selected to facilitate an increase in memory efficiency of VDS. (2) VDS having the same Group is likely to be selected to hinder an increase in virtual NW. (3) VDS whose virtual NWs is hardly to be increased in number is likely to be selected while giving preference to memory efficiency.

Only by changing workplace environment setting, all the VMs of the workplace environment can be efficiently changed. This is possible because, unlike the background art, terminal connection/data connection is tied with a workplace environment as NW band/storage region setting.

When changing terminal connection, in particular, there are also the following two effects. (1) Increase in band of terminal connection will involve as small an increase in virtual NW as possible. (2) Even when SAN disk runs short at a relocation destination, it is possible to find a VD to be replaced by the file server.

When changing data connection, in particular, there are also the following two effects. (1) Even when newly using a SAN in data connection, enhanced memory efficiency of VDS will be maintained as much as possible. (2) Even when band of terminal connection runs short at a relocation destination, VD whose band is to be limited can be found.

Figure 14:
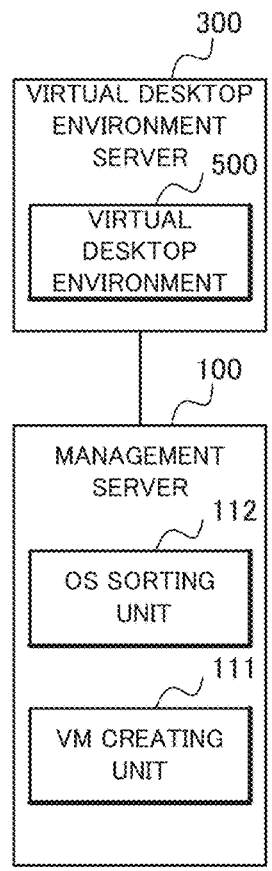
FIG. 14 is a block diagram showing a minimum structure of the thin client system according to the present invention.
Figure 15:
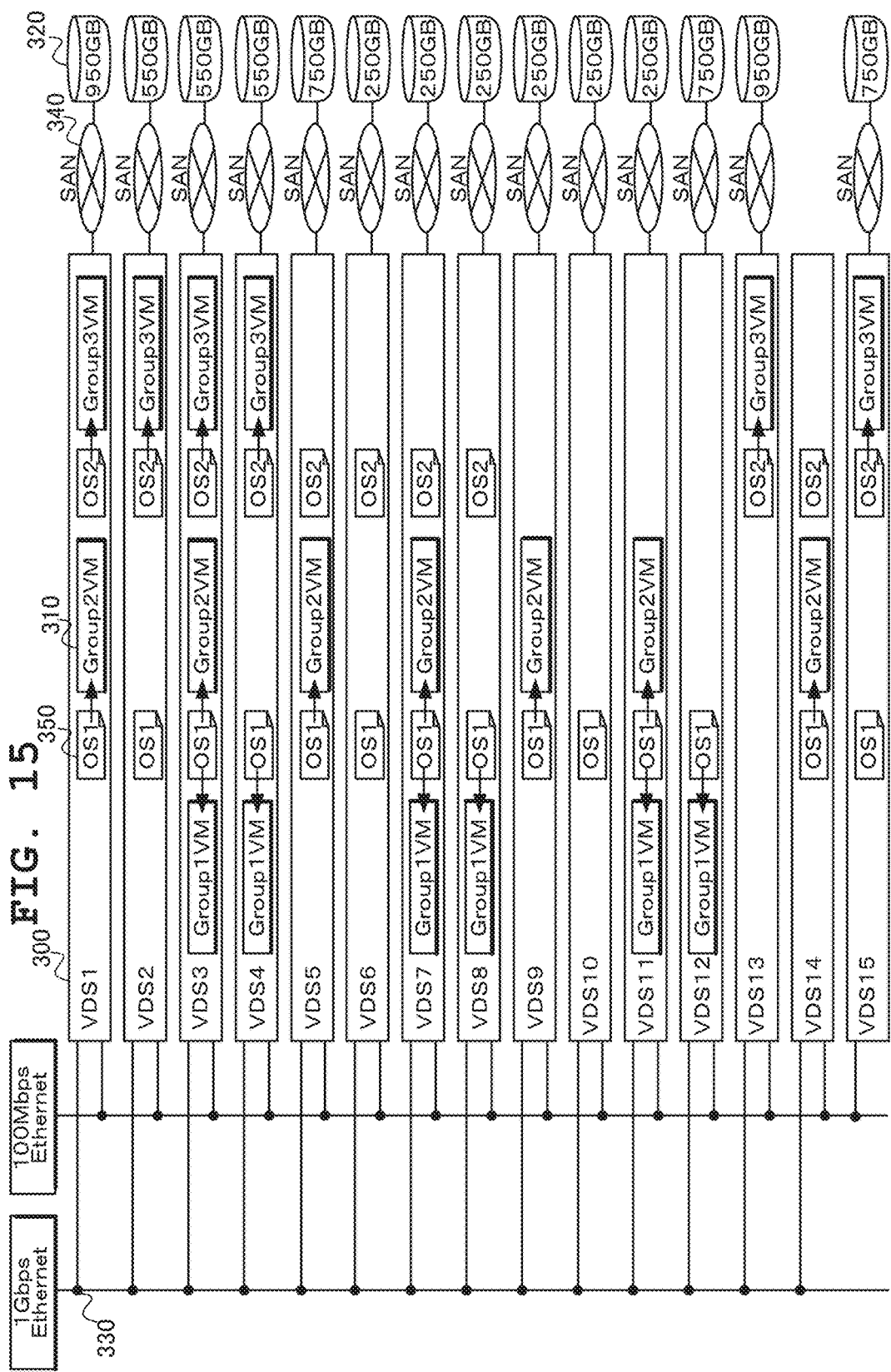
FIG. 15 is a diagram showing an arrangement example of a VDS environment according to the background art.

Minimum structure is shown in FIG. 14 which enables solution of the problems of the present invention. The above-described problems of the present invention can be solved by the thin client system 10 comprising a plurality of virtual desktop environment servers 300 each including the virtual desktop environment 500 having the virtual machine 310 in which a workplace environment is created, and the management server 100 which manages setting of the virtual desktop environment 500 and the virtual desktop environment server 300, wherein the management server 100 includes the OS sorting unit 112 which generates information of OS sorting results of the virtual desktop environment servers 300 sorted in ascending order of virtual machines 310 failing to have other OS than the OS of the virtual machine 310 to be newly created, and the VM creating unit 111 which determines the virtual desktop environment server 300 in which the virtual machine 310 is to be to created based on the information of the OS sorting results while giving preference to the virtual desktop environment servers 300 without having the virtual machine 310 of other OS in question.

Other Exemplary Embodiments

OS sorting preferential unification at S1104 executed by the VM creating unit 111 may be replaced by Group preferential unification. In this case, VDS sorting results in the order, 12, 8, 11, 7, 4, 3, 10, 6, 9, 5, 2 and 1. Alternatively, when using either one of OS sorting at S1101 and Group sorting at S1102, VDS sorting processing can be simplified while limitedly making the best of the characteristics of server virtualization.

Sorting VDS DB 202 by the column of remaining band and the column of remaining SAN region in descending order by the VDS reader 114 results in enabling a performance value to be made the best of even at the time of VM creation in addition to relocation.

As to OS of a workplace environment, it is possible to represent an OS group which enables memory efficiency to be increased and set a template OS of each virtual machine to be one in the OS group. For realizing it, it is necessary to form OS DB by a Group column and an OS column, set an ID of the Group column to the workplace DB and set an ID of the OS column to the VDS DB. Even with such setting, a manager needs not consider an extent to which memory efficiency should be increased because it is only necessary to consider only the OS group at the time of setting a workplace environment.

Reversing the order of sorting at S1132 and S1133 by the Group sorting unit 113 enables dispersion of virtual NWs on VDSs as much as possible. Although the present exemplary embodiment has a disadvantage of losing the effect of virtual NW wiring simplification, it has the effect of increasing failure-resistance and the effect of suppressing an increase in NW in operation because virtual NW which will be required for VM creation can be created early.

Refraining from executing the No Group removal at S1212 by the Bandwidth guarantee unit 121 makes it possible to cope with a case where no relocation destination can be selected at S1218. In this case, even though a virtual NW would be increased to some extent, it is expected that the increase in the virtual NW is minimized because of application of Group sorting results.

When selecting the column of VD to be relocated, in addition to S1244 of selecting VD from the top so as to prevent predicted values from becoming negative by the relocation destination selection unit 124, seeing it that the values in the columns of the remaining SAN as of after relocation and the remaining band as of after relocation will not be negative enables relocation without using constraints.

As a thin client system using no virtual machine, when handling a virtual desktop environment for each session on a server basis, for example, OS of VDS DB can be one. On this occasion, VD of the connection DB will be each session. When a workplace environment is changed, such workplace environment setting is possible as limiting a session band without relocation of VD.

As to the management server 100, setting the VD connection unit 110 to be in other server and each DB to be in other server enables a group of VM creation/relocation functions to be separated. The function group can be called up only from the VD connection unit 110 at the time of VM creation and has no DB, so that a cluster structure can be incorporated by hot standby or the like with ease.

The VDS reader 114 and the VDS performance reader 123 whose processing is expected to be often processed by each functional block of the management server 100 can be separated into other server on a Group basis. This division realizes fail soft between Groups.

Designing each functional block of the management server 100 as other server or other program facilitates update on a module basis. When providing the VM creating unit 111 which executes only OS sorting/Group sorting with a peripheral apparatus sorting unit which unifies or distributes transactions of peripheral apparatus, it will be only necessary to update only a related block.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

An arbitrary combination of the foregoing components and conversion of representation of the present invention among a method, a device, a system, a recording medium, a computer program and the like are also valid as a mode of the present invention.

The respective components of the present invention need not exist independently, and the plurality of the components may be formed as one member, one component may be formed of a plurality of members, a certain component may be a part of other component, a part of a certain component and a part of other component may overlap with each other, or the like.

In addition, although the method and the computer program of the present invention have a plurality of procedures recited in order, the order of recitation does not limit the order of execution of the plurality of procedures. Accordingly, when executing the method and the computer program of the present invention, the order of the plurality of procedures can be changed within the range not hindering the contents.

Moreover, execution of the plurality of procedures of the method and the computer program of the present invention is not limited to execution at different timing with each other. Therefore, during execution of a certain procedure, other procedure might occur, a part or all of execution timing of a certain procedure and execution timing of other procedure might overlap with each other, or the like.

Furthermore, although a part or all of the above-described exemplary embodiments can be recited also as claims to follow, they are not limited to the same.

The whole or part of the exemplary embodiments disclosed above can be described as, but not limited to, the following supplementary notes.

(Supplementary note 1.) A thin client system comprising:
a plurality of virtual desktop environment servers each including a virtual desktop environment in which a workplace environment is generated in a virtual machine,
a management server which manages setting of said virtual desktop environment and said virtual desktop environment server, wherein
said management server comprises
an OS sorting unit which generates information of an OS sorting result obtained by sorting said virtual desktop environment servers in the order of failing to have a virtual machine whose OS is other than OS of a virtual machine to be newly created, and
a VM creating unit which determines said virtual desktop environment server in which said virtual machine is to be created based on said OS sorting result information by giving preference to said virtual desktop environment server failing to have a virtual machine having that other OS.

(Supplementary note 2.) The thin client system according to supplementary note 1, wherein
said OS sorting unit sorts said virtual desktop environment servers in the order of failing to have a virtual machine whose OS is other than OS of a virtual machine to be newly created and failing to have a template of OS other than OS of the virtual machine to be newly created and generates said OS sorting result information, and
said VM creating unit preferentially selects said virtual desktop environment server in which said virtual machine is to be created in the order of failing to have a virtual machine having said other OS and failing to have a template of said other OS based on said OS sorting result information.

(Supplementary note 3.) The thin client system according to supplementary note 2, wherein
said management server includes a Group sorting unit which generates information of a Group sorting result obtained by sorting said virtual desktop environment servers in the order of having the same workplace environment as a workplace environment of a virtual machine to be newly created, and
said VM creating unit preferentially selects said virtual desktop environment server in which said virtual machine is to be created in the order of failing to have a virtual machine having said other OS, failing to have a template of said other OS and having said same workplace environment based on said OS sorting result information and said Group sorting result information.

(Supplementary note 4.) The thin client system according to supplementary note 3, wherein said Group sorting unit sorts said virtual desktop environment servers in the order of having the same workplace environment as a workplace environment related to a virtual machine to be newly created and having a smaller number of other workplace environments than the workplace environment related to the virtual machine to be newly created and generates said Group sorting result information, and said VM creating unit preferentially selects said virtual desktop environment server in which said virtual machine is to be created in the order of failing to have a virtual machine having said other OS, failing to have a template of said other OS, having said same workplace environment and having a smaller number of said other workplace environments based on said OS sorting result information and said Group sorting result information.

(Supplementary note 5.) A thin client system comprising:

a plurality of virtual desktop environment servers each including a virtual desktop environment in which a workplace environment is generated in a virtual machine, and a management server which manages setting of said virtual desktop environment and said virtual desktop environment server, wherein said management server comprises an OS sorting unit which when data connection of the virtual desktop environment is changed, generates information of an OS sorting result obtained by sorting said virtual desktop environment servers in the order of failing to have a virtual machine whose OS is other than OS of a virtual machine related to the change of the data connection and failing to have a template of OS other than OS of the virtual machine related to the change of the data connection, a data ensuring unit which generates information of sorting of said virtual desktop environment servers in the order of failing to have a virtual machine having said other OS and failing to have a template of said other OS based on the information generated by said OS sorting unit, and a relocation destination selection unit which preferentially selects said virtual desktop environment server in which said virtual desktop environment is to relocate in the order of failing to have a virtual machine having said other OS and failing to have a template of said other OS based on the information generated by said data ensuring unit.

(Supplementary note 6.) The thin client system according to supplementary note 5, wherein said management server includes a VDS performance reader which obtains information about free space of a storage related to said virtual desktop environment server, said data ensuring unit generates information of sorting of said virtual desktop environment servers in the order of failing to have a virtual machine having said other OS, failing to have a template of said other OS and free space of said storage being large based on the information generated by said OS sorting unit and the information obtained by said VDS performance reader, and said relocation destination selection unit preferentially selects said virtual desktop environment server in which said virtual desktop environment is to relocate in the order of failing to have a virtual machine having said other OS, failing to have a template of said other OS and free space of said storage being large based on the information generated by said data ensuring unit.

(Supplementary note 7.) The thin client system according to supplementary note 5 or supplementary note 6, wherein said relocation destination selection unit executes band limitation when said virtual desktop environment server selected as a relocation destination runs short of a band.

(Supplementary note 8.) A thin client system comprising:

a plurality of virtual desktop environment servers each including a virtual desktop environment in which a workplace environment is generated in a virtual machine, and a management server which manages setting of said virtual desktop environment and said virtual desktop environment server, wherein said management server comprises a Group sorting unit which when terminal connection of the virtual desktop environment is changed, generates information of a Group sorting result obtained by sorting said virtual desktop environment servers in the order of having the same workplace environment as a workplace environment of a virtual machine related to the change of the terminal connection and having a smaller number of other workplace environments than the workplace environment of the virtual machine related to the change of the terminal connection, an NW ensuring unit which generates information of sorting of said virtual desktop environment servers in the order of having the same workplace environment and having a smaller number of other workplace environments based on the information generated by said Group sorting unit, and a relocation destination selection unit which preferentially selects said virtual desktop environment server in which said virtual desktop environment is to relocate in the order of having the same workplace environment and having a smaller number of other workplace environments based on the information generated by said NW ensuring unit.

(Supplementary note 9.) The thin client system according to supplementary note 8, wherein said management server includes a VDS performance reader which obtains information about a total available band related to said virtual desktop environment server, said NW ensuring unit generates information of sorting of said virtual desktop environment servers in the order of having the same workplace environment, having a smaller number of other workplace environments and a band having room based on the information generated by said Group sorting unit and the information obtained by said VDS performance reader, and said relocation destination selection unit preferentially selects said virtual desktop environment server in which said virtual desktop environment is to relocate in the order of having the same workplace environment, having a smaller number of other workplace environments and a band having room based on the information generated by said NW ensuring unit.

(Supplementary note 10.) The thin client system according to supplementary note 8 or supplementary note 9, wherein when said virtual desktop environment server selected as a relocation destination runs short of a data storage region, said relocation destination selection unit temporality switches the data storage region to a file server.

(Supplementary note 11.) A management server which manages setting of a plurality of virtual desktop environment servers each including a virtual desktop environment in which a workplace environment is generated in a virtual machine and setting of said virtual desktop environment, comprising:

an OS sorting unit which generates information of an OS sorting result obtained by sorting said virtual desktop environment servers in the order of failing to have a virtual machine whose OS is other than OS of a virtual machine to be newly created, and a VM creating unit which determines said virtual desktop environment server in which said virtual machine is to be created based on said OS sorting result information by giving preference to said virtual desktop environment server failing to have a virtual machine having that other OS.

(Supplementary note 12.) The management server according to supplementary note 11, wherein said OS sorting unit sorts said virtual desktop environment servers in the order of failing to have a virtual machine whose OS is other than OS of a virtual machine to be newly created and failing to have a template of OS other than OS of the virtual machine to be newly created and generates said OS sorting result information, and said VM creating unit preferentially selects said virtual desktop environment server in which said virtual machine is to be created in the order of failing to have a virtual machine having said other OS and failing to have a template of said other OS based on said OS sorting result information.

(Supplementary note 13.) The management server according to supplementary note 12, further comprising:

a Group sorting unit which generates information of a Group sorting result obtained by sorting said virtual desktop environment servers in the order of having the same workplace environment as a workplace environment of a virtual machine to be newly created, and said VM creating unit preferentially selects said virtual desktop environment server in which said virtual machine is to be created in the order of failing to have a virtual machine having said other OS, failing to have a template of said other OS and having said same workplace environment based on said OS sorting result information and said Group sorting result information.

(Supplementary note 14.) The management server according to supplementary note 13, wherein said Group sorting unit sorts said virtual desktop environment servers in the order of having the same workplace environment as a workplace environment related to a virtual machine to be newly created and having a smaller number of other workplace environments than the workplace environment related to the virtual machine to be newly created and generates said Group sorting result information, and said VM creating unit preferentially selects said virtual desktop environment server in which said virtual machine is to be created in the order of failing to have a virtual machine having said other OS, failing to have a template of said other OS, having said same workplace environment and having a smaller number of said other workplace environments based on said OS sorting result information and said Group sorting result information.

(Supplementary note 15.) A management server which manages setting of a plurality of virtual desktop environment servers each including a virtual desktop environment in which a workplace environment is generated in a virtual machine and setting of said virtual desktop environment, comprising:

an OS sorting unit which when data connection of the virtual desktop environment is changed, generates information of an OS sorting result obtained by sorting said virtual desktop environment servers in the order of failing to have a virtual machine whose OS is other than OS of a virtual machine related to the change of the data connection and failing to have a template of OS other than OS of the virtual machine related to the change of the data connection, a data ensuring unit which generates information of sorting of said virtual desktop environment servers in the order of failing to have a virtual machine having said other OS and failing to have a template of said other OS based on the information generated by said OS sorting unit, and a relocation destination selection unit which preferentially selects said virtual desktop environment server in which said virtual desktop environment is to relocate in the order of failing to have a virtual machine having said other OS and failing to have a template of said other OS based on the information generated by said data ensuring unit.

(Supplementary note 16.) The management server according to supplementary note 15, further comprising:

a VDS performance reader which obtains information about free space of a storage related to said virtual desktop environment server, wherein said data ensuring unit generates information of sorting of said virtual desktop environment servers in the order of failing to have a virtual machine having said other OS, failing to have a template of said other OS and free space of said storage being large based on the information generated by said OS sorting unit and the information obtained by said VDS performance reader, and said relocation destination selection unit preferentially selects said virtual desktop environment server in which said virtual desktop environment is to relocate in the order of failing to have a virtual machine having said other OS, failing to have a template of said other OS and free space of said storage being large based on the information generated by said data ensuring unit.

(Supplementary note 17.) The management server according to supplementary note 15 or supplementary note 16, wherein said relocation destination selection unit executes band limitation when said virtual desktop environment server selected as a relocation destination runs short of a band.

(Supplementary note 18.) A management server which manages setting of a plurality of virtual desktop environment servers each including a virtual desktop environment in which a workplace environment is generated in a virtual machine and setting of said virtual desktop environment, comprising:

a Group sorting unit which when terminal connection of the virtual desktop environment is changed, generates information of a Group sorting result obtained by sorting said virtual desktop environment servers in the order of having the same workplace environment as a workplace environment of a virtual machine related to the change of the terminal connection and having a smaller number of other workplace environments than the workplace environment of the virtual machine related to the change of the terminal connection, an NW ensuring unit which generates information of sorting of said virtual desktop environment servers in the order of having the same workplace environment and having a smaller number of other workplace environments based on the information generated by said Group sorting unit, and a relocation destination selection unit which preferentially selects said virtual desktop environment server in which said virtual desktop environment is to relocate in the order of having the same workplace environment and having a smaller number of other workplace environments based on the information generated by said NW ensuring unit.

(Supplementary note 19.) The management server according to supplementary note 18, further comprising:

a VDS performance reader which obtains information about a total available band related to said virtual desktop environment server, wherein said NW ensuring unit generates information of sorting of said virtual desktop environment servers in the order of having the same workplace environment, having a smaller number of other workplace environments and a band having room based on the information generated by said Group sorting unit and the information obtained by said VDS performance reader, and said relocation destination selection unit preferentially selects said virtual desktop environment server in which said virtual desktop environment is to relocate in the order of having the same workplace environment, having a smaller number of other workplace environments and a band having room based on the information generated by said NW ensuring unit.

(Supplementary note 20.) The management server according to supplementary note 18 or supplementary note 19, wherein when said virtual desktop environment server selected as a relocation destination runs short of a data storage region, said relocation destination selection unit temporality switches the data storage region to a file server.

(Supplementary note 21.) A workplace environment setting method by a management server which manages setting of a plurality of virtual desktop environment servers each including a virtual desktop environment in which a workplace environment is generated in a virtual machine and setting of said virtual desktop environment, comprising:

a step executed by an OS sorting unit of generating information of an OS sorting result obtained by sorting said virtual desktop environment servers in the order of failing to have a virtual machine whose OS is other than OS of a virtual machine to be newly created, and a step executed by a VM creating unit of determining said virtual desktop environment server in which said virtual machine is to be created based on said OS sorting result information by giving preference to said virtual desktop environment server failing to have a virtual machine having that other OS.

(Supplementary note 22.) The workplace environment setting method according to supplementary note 21, wherein said OS sorting step includes sorting said virtual desktop environment servers in the order of failing to have a virtual machine whose OS is other than OS of a virtual machine to be newly created and failing to have a template of OS other than OS of the virtual machine to be newly created and generating said OS sorting result information, and said VM creating step includes preferentially selecting said virtual desktop environment server in which said virtual machine is to be created in the order of failing to have a virtual machine having said other OS and failing to have a template of said other OS based on said OS sorting result information.

(Supplementary note 23.) The workplace environment setting method according to supplementary note 22, further comprising:

the Group sorting step executed by a Group sorting unit of generating information of a Group sorting result obtained by sorting said virtual desktop environment servers in the order of having the same workplace environment as a workplace environment of a virtual machine to be newly created, wherein said VM creating step includes preferentially selecting said virtual desktop environment server in which said virtual machine is to be created in the order of failing to have a virtual machine having said other OS, failing to have a template of said other OS and having said same workplace environment based on said OS sorting result information and said Group sorting result information.

(Supplementary note 24.) The workplace environment setting method according to supplementary note 23, wherein said Group sorting step includes sorting said virtual desktop environment servers in the order of having the same workplace environment as a workplace environment related to a virtual machine to be newly created and having a smaller number of other workplace environments than the workplace environment related to the virtual machine to be newly created and generating said Group sorting result information, and said VM creating step includes preferentially selecting said virtual desktop environment server in which said virtual machine is to be created in the order of failing to have a virtual machine having said other OS, failing to have a template of said other OS, having said same workplace environment and having a smaller number of said other workplace environments based on said OS sorting result information and said Group sorting result information.

(Supplementary note 25.) A workplace environment setting method by a management server which manages setting of a plurality of virtual desktop environment servers each including a virtual desktop environment in which a workplace environment is generated in a virtual machine and setting of said virtual desktop environment, comprising:

the OS sorting step executed by an OS sorting unit of, when data connection of the virtual desktop environment is changed, generating information of an OS sorting result obtained by sorting said virtual desktop environment servers in the order of failing to have a virtual machine whose OS is other than OS of a virtual machine related to the change of the data connection and failing to have a template of OS other than OS of the virtual machine related to the change of the data connection, the data ensuring step executed by a data ensuring unit of generating information of sorting of said virtual desktop environment servers in the order of failing to have a virtual machine having said other OS and failing to have a template of said other OS based on the information generated by said OS sorting unit, and the relocation destination selecting step executed by a relocation destination selection unit of preferentially selecting said virtual desktop environment server in which said virtual desktop environment is to relocate in the order of failing to have a virtual machine having said other OS and failing to have a template of said other OS based on the information generated by said data ensuring unit.

(Supplementary note 26.) The workplace environment setting method according to supplementary note 25, further comprising:

the VDS performance obtaining step executed by a VDS performance reader of obtaining information about free space of a storage related to said virtual desktop environment server, wherein said data ensuring step includes generating information of sorting of said virtual desktop environment servers in the order of failing to have a virtual machine having said other OS, failing to have a template of said other OS and free space of said storage being large based on the information generated by said OS sorting unit and the information obtained by said VDS performance reader, and said relocation destination selecting step includes preferentially selecting said virtual desktop environment server in which said virtual desktop environment is to relocate in the order of failing to have a virtual machine having said other OS, failing to have a template of said other OS and free space of said storage being large based on the information generated by said data ensuring unit.

(Supplementary note 27.) The workplace environment setting method according to supplementary note 25 or supplementary note 26, wherein said relocation destination selection step includes executing band limitation when said virtual desktop environment server selected as a relocation destination runs short of a band.

(Supplementary note 28.) A workplace environment setting method by a management server which manages setting of a plurality of virtual desktop environment servers each including a virtual desktop environment in which a workplace environment is generated in a virtual machine and setting of said virtual desktop environment, comprising:

the Group sorting step executed by a Group sorting unit of, when terminal connection of the virtual desktop environment is changed, generating information of a Group sorting result obtained by sorting said virtual desktop environment servers in the order of having the same workplace environment as a workplace environment of a virtual machine related to the change of the terminal connection and having a smaller number of other workplace environments than the workplace environment of the virtual machine related to the change of the terminal connection, the NW ensuring step executed by an NW ensuring unit of generating information of sorting of said virtual desktop environment servers in the order of having the same workplace environment and having a smaller number of other workplace environments based on the information generated by said Group sorting unit, and the relocation destination selecting step executed by a relocation destination selection unit of preferentially selecting said virtual desktop environment server in which said virtual desktop environment is to relocate in the order of having the same workplace environment and having a smaller number of other workplace environments based on the information generated by said NW ensuring unit.

(Supplementary note 29.) The workplace environment setting method according to supplementary note 28, further comprising:

the VDS performance obtaining step executed by a VDS performance reader of obtaining information about a total available band related to said virtual desktop environment server, wherein said NW ensuring step includes generating information of sorting of said virtual desktop environment servers in the order of having the same workplace environment, having a smaller number of other workplace environments and a band having room based on the information generated by said Group sorting unit and the information obtained by said VDS performance reader, and said relocation destination selecting step includes preferentially selecting said virtual desktop environment server in which said virtual desktop environment is to relocate in the order of having the same workplace environment, having a smaller number of other workplace environments and a band having room based on the information generated by said NW ensuring unit.

(Supplementary note 30.) The workplace environment setting method according to supplementary note 28 or supplementary note 29, wherein said relocation destination selecting step includes, when said virtual desktop environment server selected as a relocation destination runs short of a data storage region, temporality switching the data storage region to a file server.

(Supplementary note 31.) A workplace environment setting program operable on a computer forming a management server which manages setting of a plurality of virtual desktop environment servers each including a virtual desktop environment in which a workplace environment is generated in a virtual machine and setting of said virtual desktop environment, which causes:

an OS sorting unit to execute OS sorting processing of generating information of an OS sorting result obtained by sorting said virtual desktop environment servers in the order of failing to have a virtual machine whose OS is other than OS of a virtual machine to be newly created, and a VM creating unit to execute VM creating processing of determining said virtual desktop environment server in which said virtual machine is to be created based on said OS sorting result information by giving preference to said virtual desktop environment server failing to have the virtual machine having that other OS.

(Supplementary note 32.) The workplace environment setting program according to supplementary note 31, wherein said OS sorting processing includes sorting said virtual desktop environment servers in the order of failing to have a virtual machine whose OS is other than OS of a virtual machine to be newly created and failing to have a template of OS other than OS of the virtual machine to be newly created and generating said OS sorting result information, and said VM creating processing includes preferentially selecting said virtual desktop environment server in which said virtual machine is to be created in the order of failing to have a virtual machine having said other OS and failing to have a template of said other OS based on said OS sorting result information.

(Supplementary note 33.) The workplace environment setting program according to supplementary note 32, which causes a Group sorting unit to execute the Group sorting processing of generating information of a Group sorting result obtained by sorting said virtual desktop environment servers in the order of having the same workplace environment as a workplace environment of a virtual machine to be newly created, wherein said VM creating processing includes preferentially selecting said virtual desktop environment server in which said virtual machine is to be created in the order of failing to have a virtual machine having said other OS, failing to have a template of said other OS and having said same workplace environment based on said OS sorting result information and said Group sorting result information.

(Supplementary note 34.) The workplace environment setting program according to supplementary note 33, wherein said Group sorting processing includes sorting said virtual desktop environment servers in the order of having the same workplace environment as a workplace environment related to a virtual machine to be newly created and having a smaller number of other workplace environments than the workplace environment related to the virtual machine to be newly created and generating said Group sorting result information, and said VM creating processing includes preferentially selecting said virtual desktop environment server in which said virtual machine is to be created in the order of failing to have a virtual machine having said other OS, failing to have a template of said other OS, having said same workplace environment and having a smaller number of said other workplace environments based on said OS sorting result information and said Group sorting result information.

(Supplementary note 35.) A workplace environment setting program operable on a computer forming a management server which manages setting of a plurality of virtual desktop environment servers each including a virtual desktop environment in which a workplace environment is generated in a virtual machine and setting of said virtual desktop environment, which causes:

an OS sorting unit to execute the OS sorting processing of, when data connection of the virtual desktop environment is changed, generating information of an OS sorting result obtained by sorting said virtual desktop environment servers in the order of failing to have a virtual machine whose OS is other than OS of a virtual machine related to the change of the data connection and failing to have a template of OS other than OS of the virtual machine related to the change of the data connection, a data ensuring unit to execute the data ensuring processing of generating information of sorting of said virtual desktop environment servers in the order of failing to have a virtual machine having said other OS and failing to have a template of said other OS based on the information generated by said OS sorting unit, and a relocation destination selection unit to execute the relocation destination selecting processing of preferentially selecting said virtual desktop environment server in which said virtual desktop environment is to relocate in the order of failing to have a virtual machine having said other OS and failing to have a template of said other OS based on the information generated by said data ensuring unit.

(Supplementary note 36.) The workplace environment setting program according to supplementary note 35, which causes:

a VDS performance reader to execute the VDS performance obtaining processing of obtaining information about free space of a storage related to said virtual desktop environment server, wherein said data ensuring processing includes generating information of sorting of said virtual desktop environment servers in the order of failing to have a virtual machine having said other OS, failing to have a template of said other OS and free space of said storage being large based on the information generated by said OS sorting unit and the information obtained by said VDS performance reader, and said relocation destination selecting processing includes preferentially selecting said virtual desktop environment server in which said virtual desktop environment is to relocate in the order of failing to have a virtual machine having said other OS, failing to have a template of said other OS and free space of said storage being large based on the information generated by said data ensuring unit.

(Supplementary note 37.) The workplace environment setting program according to supplementary note 35 or supplementary note 36, wherein said relocation destination selecting processing includes executing band limitation when said virtual desktop environment server selected as a relocation destination runs short of a band.

(Supplementary note 38.) A workplace environment setting program operable on a computer forming a management server which manages setting of a plurality of virtual desktop environment servers each including a virtual desktop environment in which a workplace environment is generated in a virtual machine and setting of said virtual desktop environment, which causes:

a Group sorting unit to execute the Group sorting processing of, when terminal connection of the virtual desktop environment is changed, generating information of a Group sorting result obtained by sorting said virtual desktop environment servers in the order of having the same workplace environment as a workplace environment of a virtual machine related to the change of the terminal connection and having a smaller number of other workplace environments than the workplace environment of the virtual machine related to the change of the terminal connection, an NW ensuring unit to execute the NW ensuring processing of generating information of sorting of said virtual desktop environment servers in the order of having the same workplace environment and having a smaller number of other workplace environments based on the information generated by said Group sorting unit, and a relocation destination selection unit to execute the relocation destination selecting processing of preferentially selecting said virtual desktop environment server in which said virtual desktop environment is to relocate in the order of having the same workplace environment and having a smaller number of other workplace environments based on the information generated by said NW ensuring unit.

(Supplementary note 39.) The workplace environment setting program according to supplementary note 38, which causes:

a VDS performance reader to execute the VDS performance obtaining processing of obtaining information about a total available band related to said virtual desktop environment server, wherein said NW ensuring processing includes generating information of sorting of said virtual desktop environment servers in the order of having the same workplace environment, having a smaller number of other workplace environments and a band having room based on the information generated by said Group sorting unit and the information obtained by said VDS performance reader, and said relocation destination selecting processing includes preferentially selecting said virtual desktop environment server in which said virtual desktop environment is to relocate in the order of having the same workplace environment, having a smaller number of other workplace environments and a band having room based on the information generated by said NW ensuring unit.

(Supplementary note 40.) The workplace environment setting program according to supplementary note 38 or supplementary note 39, wherein said relocation destination selecting processing includes, when said virtual desktop environment server selected as a relocation destination runs short of a data storage region, temporality switching the data storage region to a file server.

INCORPORATION BY REFERENCE

This application is based upon and claims the benefit of priority from Japanese patent application No. 2012-048851, filed on Mar. 6, 2012, the disclosure of which is incorporated herein in its entirety by reference.

What is claimed is:
1. A workplace environment setting method by a management server which manages setting of a plurality of virtual desktop environment servers each including a virtual desktop environment in which a workplace environment is generated in a virtual machine and setting of said virtual desktop environment, comprising:
- when data connection of the virtual desktop environment is changed, generating information of an OS sorting result obtained by sorting said virtual desktop environment servers in an order of failing to have a virtual machine whose OS is other than OS of a virtual machine related to the change of the data connection and failing to have a template of OS other than OS of the virtual machine related to the change of the data connection;
- determining said virtual desktop environment server in which said virtual machine is to be created based on said OS sorting result information by giving preference to said virtual desktop environment server failing to have a virtual machine having whose OS is different from the OS of a virtual machine to be newly created and failing to have a template of OS other than OS of the virtual machine related to the change of the data connection; and
- removing the virtual desktop environment server relevant to a predetermined removal option from the information of said OS sorting result using a VDS (Virtual Desktop Server) removal unit.

2. A workplace environment setting method according to claim 1, further comprising:
- generating information of sorting of said virtual desktop environment servers in the order of failing to have a virtual machine having said other OS and failing to have a template of said other OS based on the generated information of the VDS removal unit; and
- preferentially selecting said virtual desktop environment server in which said virtual desktop environment is to relocate in the order of failing to have a virtual machine having said other OS and failing to have a template of said other OS based on the generated information of sorting of said virtual desktop environment servers.

3. A workplace environment setting method according to claim 1, further comprising:
- when terminal connection of the virtual desktop environment is changed, generating information of a Group sorting result obtained by sorting said virtual desktop environment servers in an order of having the same workplace environment as a workplace environment of a virtual machine related to the change of the terminal connection and having a smaller number of other workplace environments than the workplace environment of the virtual machine related to the change of the terminal connection,
- wherein the removing the virtual desktop environment server comprises removing the virtual desktop environment server relevant to a predetermined removal option from the information of said Group sorting result using the VDS removal unit;
- generating information of sorting of said virtual desktop environment servers in the order of having the same workplace environment and having a smaller number of other workplace environments based on the generated information of the VDS removal unit; and
- preferentially selecting said virtual desktop environment server in which said virtual desktop environment is to relocate in the order of having the same workplace environment and having a smaller number of other workplace environments based on the generated information of sorting of said virtual desktop environment servers.

4. A management server which manages setting of a plurality of virtual desktop environment servers each including a virtual desktop environment in which a workplace environment is generated in a virtual machine and setting of said virtual desktop environment, comprising:
- at least one memory operable to store program instructions;
- at least one processor operable to read the stored program instructions; and
- according to the stored program instructions, the at least one processor is configured to be operated as:
- an OS sorting unit which when data connection of the virtual desktop environment is changed, generates information of an OS sorting result obtained by sorting said virtual desktop environment servers in an order of failing to have a virtual machine whose OS is other than OS of a virtual machine related to the change of the data connection and failing to have a template of OS other than OS of the virtual machine related to the change of the data connection;
- a virtual machine (VM) creating unit which determines said virtual desktop environment server in which said virtual machine is to be created based on said OS sorting result information by giving preference to said virtual desktop environment server failing to have a virtual machine whose OS is different from the OS of a virtual machine to be newly created and failing to have a template of OS other than OS of the virtual machine related to the change of the data connection; and
- a VDS (Virtual Desktop Server) removal unit which removes the virtual desktop environment server relevant to a predetermined removal option from the information of said OS sorting result.

5. A management server according to claim 4, wherein the at least one processor is further configured to be operated as:
- a data ensuring unit which generates information of sorting of said virtual desktop environment servers in the order of failing to have a virtual machine having said other OS and failing to have a template of said other OS based on the information generated by said VDS removal unit; and
- a relocation destination selection unit which preferentially selects said virtual desktop environment server in which said virtual desktop environment is to relocate in the order of failing to have a virtual machine having said other OS and failing to have a template of said other OS based on the information generated by said data ensuring unit.

6. A management server according to claim 4, wherein the at least one processor is further configured to be operated as:
- a Group sorting unit which when terminal connection of the virtual desktop environment is changed, generates information of a Group sorting result obtained by sorting said virtual desktop environment servers in an order of having the same workplace environment as a workplace environment of a virtual machine related to the change of the terminal connection and having a smaller number of other workplace environments than the workplace environment of the virtual machine related to the change of the terminal connection,
- wherein the VDS removal unit removes the virtual desktop environment server relevant to a predetermined removal option from the information of said Group sorting result;
- an NW ensuring unit which generates information of sorting of said virtual desktop environment servers in the order of having the same workplace environment and having a smaller number of other workplace environments based on the information generated by said VDS removal unit; and a relocation destination selection unit which preferentially selects said virtual desktop environment server in which said virtual desktop environment is to relocate in the order of having the same workplace environment and having a smaller number of other workplace environments based on the information generated by said NW ensuring unit.

7. A thin client system comprising:

a plurality of virtual desktop environment servers each including a virtual desktop environment in which a workplace environment is generated in a virtual machine; and a management server which manages setting of said virtual desktop environment and said virtual desktop environment server, wherein said management server comprises:

at least one memory operable to store program instructions;

at least one processor operable to read the stored program instructions; and according to the stored program instructions, the at least one processor is configured to be operated as:

an OS sorting unit which, when data connection of the virtual desktop environment is changed, generates information of an OS sorting result obtained by sorting said virtual desktop environment servers in an order of failing to have a virtual machine whose OS is other than OS of a virtual machine related to the change of the data connection and failing to have a template of OS other than OS of the virtual machine related to the change of the data connection, a virtual machine (VM) creating unit which determines said virtual desktop environment server in which said virtual machine is to be created based on said OS sorting result information by giving preference to said virtual desktop environment server failing to have a virtual machine whose OS is different from the OS of a virtual machine to be newly created and failing to have a template of OS other than OS of the virtual machine related to the change of the data connection, and a VDS (Virtual Desktop Server) removal unit which removes the virtual desktop environment server relevant to a predetermined removal option from the information of said OS sorting result.

8. A thin client system according to claim 7, wherein the at least one processor of the said management server is further configured to be operated as:

a data ensuring unit which generates information of sorting of said virtual desktop environment servers in the order of failing to have a virtual machine having said other OS and failing to have a template of said other OS based on the information generated by said VDS removal unit, and a relocation destination selection unit which preferentially selects said virtual desktop environment server in which said virtual desktop environment is to relocate in the order of failing to have a virtual machine having said other OS and failing to have a template of said other OS based on the information generated by said data ensuring unit.

9. A thin client system comprising:

a plurality of virtual desktop environment servers each including a virtual desktop environment in which a workplace environment is generated in a virtual machine; and a management server which manages setting of said virtual desktop environment and said virtual desktop environment server, wherein said management server comprises:

at least one memory operable to store program instructions;

at least one processor operable to read the stored program instructions; and according to the stored program instructions, the at least one processor is configured to be operated as:

a Group sorting unit which when terminal connection of the virtual desktop environment is changed, generates information of a Group sorting result obtained by sorting said virtual desktop environment servers in an order of having the same workplace environment as a workplace environment of a virtual machine related to the change of the terminal connection and having a smaller number of other workplace environments than the workplace environment of the virtual machine related to the change of the terminal connection, a virtual machine (VM) creating unit which determines said virtual desktop environment server in which said virtual machine is to be created based on said Group sorting result information by giving preference to said virtual desktop environment server having the same workplace environment as a workplace environment of a virtual machine related to the change of the terminal connection and having a smaller number of other workplace environments than the workplace environment of the virtual machine related to the change of the terminal connection, a VDS (Virtual Desktop Server) removal unit which removes the virtual desktop environment server relevant to a predetermined removal option from the information of said Group sorting result, a network (NW) ensuring unit which generates information of sorting of said virtual desktop environment servers in the order of having the same workplace environment and having a smaller number of other workplace environments based on the information generated by said VDS removal unit, and a relocation destination selection unit which preferentially selects said virtual desktop environment server in which said virtual desktop environment is to relocate in the order of having the same workplace environment and having a smaller number of other workplace environments based on the information generated by said NW ensuring unit.

10. A non-transitory computer-readable recording medium storing a workplace environment setting program operable on a computer forming a management server which manages setting of a plurality of virtual desktop environment servers each including a virtual desktop environment in which a workplace environment is generated in a virtual machine and setting of said virtual desktop environment, wherein said workplace environment setting program causes said computer to execute:

an OS sorting unit which, when data connection of the virtual desktop environment is changed, generates information of an OS sorting result obtained by sorting said virtual desktop environment servers in an order of failing to have a virtual machine whose OS is other than OS of a virtual machine related to the change of the data connection and failing to have a template of OS other than OS of the virtual machine related to the change of the data connection;

a virtual machine (VM) creating unit to execute VM creating processing of determining said virtual desktop environment server in which said virtual machine is to be created based on said OS sorting result information by giving preference to said virtual desktop environment server failing to have the virtual machine whose OS is different from the OS of a virtual machine to be newly created and failing to have a template of OS other than OS of the virtual machine related to the change of the data connection; and a VDS (Virtual Desktop Server) removal unit which removes the virtual desktop environment server relevant to a predetermined removal option from the information of said OS sorting result.

* * * * *